United States Patent
Appelman et al.

(10) Patent No.: US 9,360,996 B2
(45) Date of Patent: Jun. 7, 2016

(54) INTELLIGENTLY ENABLED MENU CHOICES BASED ON ONLINE PRESENCE STATE IN ADDRESS BOOK

(75) Inventors: Barry Appelman, McLean, VA (US);
Roy Ben-Yoseph, Ashburn, VA (US);
Brian Heikes, Ashburn, VA (US);
Valerie Kucharewski, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 473 days.

(21) Appl. No.: 13/396,132

(22) Filed: Feb. 14, 2012

(65) Prior Publication Data
US 2012/0144310 A1   Jun. 7, 2012

Related U.S. Application Data

(63) Continuation of application No. 10/633,636, filed on Aug. 5, 2003, now Pat. No. 8,132,110, which is a continuation-in-part of application No. 09/848,231, filed on May 4, 2001, now Pat. No. 8,122,363.

(60) Provisional application No. 60/201,738, filed on May 4, 2000, provisional application No. 60/229,311, filed on Sep. 1, 2000.

(51) Int. Cl.
*G06F 3/0482* (2013.01)
*H04M 1/247* (2006.01)

(52) U.S. Cl.
CPC .......... *G06F 3/0482* (2013.01); *H04M 1/2477* (2013.01)

(58) Field of Classification Search
USPC ......... 715/752, 739, 758, 810, 747, 781, 751, 715/733, 864, 835, 736, 765; 379/142.04; 709/227, 228, 206
See application file for complete search history.

(56) References Cited

U.S. PATENT DOCUMENTS

| | | |
|---|---|---|
| 4,837,798 A | 6/1989 | Cohen et al. |
| 5,086,394 A | 2/1992 | Shapira |
| 5,276,905 A | 1/1994 | Hurst et al. |

(Continued)

FOREIGN PATENT DOCUMENTS

| | | |
|---|---|---|
| EP | 0862304 A2 | 9/1998 |
| EP | 1176840 A1 | 1/2002 |

(Continued)

OTHER PUBLICATIONS

U.S. Appl. No. 09/843,788, Mar. 11, 2008, Notice of Allowance.

(Continued)

*Primary Examiner* — Linh K Pham
*Assistant Examiner* — Wendy Nicholas
(74) *Attorney, Agent, or Firm* — Keller Jolley Preece

(57) ABSTRACT

A computer implemented method for intelligently enabling menu choices includes rendering, on a client system, an address book user interface comprising information related to one or more contacts, selecting a contact from the address book user interface, determining an online presence state for the selected contact, enabling one or more menu options based upon the determined online presence state, with the menu options enabled for a first online presence state differing from the menu options enabled for a second online presence state, and presenting the enabled menu options to a user in a user interface.

20 Claims, 14 Drawing Sheets

(56) References Cited

U.S. PATENT DOCUMENTS

| | | | |
|---|---|---|---|
| 5,327,486 | A | 7/1994 | Wolff et al. |
| 5,533,110 | A | 7/1996 | Pinard et al. |
| 5,548,637 | A | 8/1996 | Heller et al. |
| 5,557,659 | A | 9/1996 | Hyde-Thomson |
| 5,583,920 | A | 12/1996 | Wheeler, Jr. |
| 5,608,786 | A | 3/1997 | Gordon |
| 5,610,910 | A | 3/1997 | Focsaneanu et al. |
| 5,650,994 | A | 7/1997 | Daley |
| 5,694,616 | A | 12/1997 | Johnson et al. |
| 5,721,906 | A | 2/1998 | Siefert |
| 5,742,905 | A | 4/1998 | Pepe et al. |
| 5,764,916 | A | 6/1998 | Busey et al. |
| 5,765,033 | A | 6/1998 | Miloslavsky |
| 5,774,670 | A | 6/1998 | Montulli |
| 5,790,800 | A | 8/1998 | Gauvin et al. |
| 5,793,365 | A | 8/1998 | Tang et al. |
| 5,802,470 | A | 9/1998 | Gaulke et al. |
| 5,835,724 | A | 11/1998 | Smith |
| 5,838,458 | A | 11/1998 | Tsai |
| 5,848,134 | A | 12/1998 | Sekiguchi et al. |
| 5,850,594 | A | 12/1998 | Cannon et al. |
| 5,859,979 | A | 1/1999 | Tung et al. |
| 5,867,162 | A | 2/1999 | O'Leary et al. |
| 5,870,549 | A | 2/1999 | Bobo, II |
| 5,870,744 | A | 2/1999 | Sprague |
| 5,872,521 | A | 2/1999 | Lopatukin et al. |
| 5,878,219 | A | 3/1999 | Vance, Jr. et al. |
| 5,893,091 | A | 4/1999 | Hunt et al. |
| 5,893,099 | A | 4/1999 | Sclireiber et al. |
| 5,919,247 | A | 7/1999 | Van Hoff et al. |
| 5,920,692 | A | 7/1999 | Nguyen et al. |
| 5,940,488 | A | 8/1999 | DeGrazia et al. |
| 5,946,617 | A | 8/1999 | Portaro et al. |
| 5,948,058 | A | 9/1999 | Kudoh et al. |
| 5,951,643 | A | 9/1999 | Shelton et al. |
| 5,951,646 | A | 9/1999 | Brandon |
| 5,951,652 | A | 9/1999 | Ingrassia, Jr. et al. |
| 5,954,798 | A | 9/1999 | Shelton et al. |
| 5,956,716 | A | 9/1999 | Kenner et al. |
| 5,960,173 | A | 9/1999 | Tang et al. |
| 5,974,446 | A | 10/1999 | Sonnenreich et al. |
| 5,983,369 | A | 11/1999 | Bakoglu et al. |
| 5,987,113 | A | 11/1999 | James |
| 5,987,407 | A | 11/1999 | Wu et al. |
| 5,991,791 | A | 11/1999 | Siefert |
| 5,995,023 | A | 11/1999 | Kreft |
| 6,002,402 | A | 12/1999 | Schaecher |
| 6,006,179 | A | 12/1999 | Wu et al. |
| 6,009,413 | A | 12/1999 | Webber et al. |
| 6,009,462 | A | 12/1999 | Birrell et al. |
| 6,012,051 | A | 1/2000 | Sammon, Jr. et al. |
| 6,014,135 | A | 1/2000 | Fernandes |
| 6,014,638 | A | 1/2000 | Burge et al. |
| 6,018,571 | A * | 1/2000 | Langlois et al. ......... 379/201.04 |
| 6,026,403 | A | 2/2000 | Siefert |
| 6,026,429 | A | 2/2000 | Jones et al. |
| 6,049,533 | A | 4/2000 | Norman et al. |
| 6,065,047 | A | 5/2000 | Carpenter et al. |
| 6,067,548 | A | 5/2000 | Cheng |
| 6,070,171 | A | 5/2000 | Snyder et al. |
| 6,073,138 | A | 6/2000 | De l'Etraz et al. |
| 6,081,830 | A | 6/2000 | Schindler |
| 6,085,223 | A | 7/2000 | Carino, Jr. et al. |
| 6,088,435 | A | 7/2000 | Barber et al. |
| 6,122,647 | A | 9/2000 | Horowitz et al. |
| 6,134,432 | A | 10/2000 | Holmes et al. |
| 6,144,991 | A | 11/2000 | England |
| 6,151,584 | A | 11/2000 | Papierniak et al. |
| 6,161,130 | A | 12/2000 | Horvitz et al. |
| 6,166,730 | A | 12/2000 | Goode et al. |
| 6,175,831 | B1 | 1/2001 | Weinreich et al. |
| 6,175,859 | B1 | 1/2001 | Mohler |
| 6,189,019 | B1 | 2/2001 | Blumer et al. |
| 6,192,395 | B1 | 2/2001 | Lerner et al. |
| 6,195,354 | B1 | 2/2001 | Skalecki et al. |
| 6,199,103 | B1 | 3/2001 | Sakaguchi et al. |
| 6,208,659 | B1 | 3/2001 | Govindarajan et al. |
| 6,212,548 | B1 | 4/2001 | DeSimone et al. |
| 6,212,550 | B1 | 4/2001 | Segur |
| 6,223,213 | B1 | 4/2001 | Cleron et al. |
| 6,233,318 | B1 | 5/2001 | Picard et al. |
| 6,233,577 | B1 | 5/2001 | Ramasubramani et al. |
| 6,240,430 | B1 | 5/2001 | Deike et al. |
| 6,249,740 | B1 | 6/2001 | Ito et al. |
| 6,249,743 | B1 | 6/2001 | Ohshimo |
| 6,260,148 | B1 * | 7/2001 | Aggarwal et al. ............... 726/14 |
| 6,269,369 | B1 | 7/2001 | Robertson |
| 6,301,609 | B1 | 10/2001 | Aravamudan et al. |
| 6,311,211 | B1 | 10/2001 | Shaw |
| 6,313,855 | B1 | 11/2001 | Shuping et al. |
| 6,314,450 | B1 | 11/2001 | Hachiya et al. |
| 6,317,776 | B1 | 11/2001 | Broussard et al. |
| 6,324,541 | B1 | 11/2001 | De l'Etraz et al. |
| 6,330,590 | B1 | 12/2001 | Cotten |
| 6,347,332 | B1 | 2/2002 | Malet et al. |
| 6,351,698 | B1 | 2/2002 | Kubota et al. |
| 6,353,825 | B1 | 3/2002 | Ponte |
| 6,356,922 | B1 | 3/2002 | Schilit et al. |
| 6,360,215 | B1 | 3/2002 | Judd et al. |
| 6,363,392 | B1 | 3/2002 | Halstead et al. |
| 6,366,950 | B1 | 4/2002 | Scheussler et al. |
| 6,370,497 | B1 | 4/2002 | Knowles |
| 6,374,246 | B1 | 4/2002 | Matsuo |
| 6,374,290 | B1 | 4/2002 | Scharber et al. |
| 6,381,593 | B1 | 4/2002 | Yano et al. |
| 6,389,127 | B1 | 5/2002 | Vardi et al. |
| 6,389,372 | B1 | 5/2002 | Glance et al. |
| 6,393,464 | B1 | 5/2002 | Dieterman |
| 6,400,381 | B1 | 6/2002 | Barrett et al. |
| 6,400,845 | B1 | 6/2002 | Volino |
| 6,405,035 | B1 | 6/2002 | Singh |
| 6,405,249 | B1 | 6/2002 | Matsuda et al. |
| 6,408,316 | B1 | 6/2002 | Himmel et al. |
| 6,415,318 | B1 | 7/2002 | Aggarwal et al. |
| 6,421,439 | B1 | 7/2002 | Liffick |
| 6,421,709 | B1 | 7/2002 | McCormick et al. |
| 6,424,828 | B1 | 7/2002 | Collins et al. |
| 6,425,012 | B1 | 7/2002 | Trovato et al. |
| 6,430,344 | B1 | 8/2002 | Dixon et al. |
| 6,430,604 | B1 | 8/2002 | Ogle et al. |
| 6,434,601 | B1 | 8/2002 | Rollins |
| 6,442,546 | B1 | 8/2002 | Biliris et al. |
| 6,446,112 | B1 | 9/2002 | Bunney et al. |
| 6,449,344 | B1 | 9/2002 | Goldfinger et al. |
| 6,449,634 | B1 | 9/2002 | Capiel |
| 6,463,461 | B1 | 10/2002 | Hanson et al. |
| 6,467,080 | B1 | 10/2002 | Devine et al. |
| 6,480,885 | B1 | 11/2002 | Olivier |
| 6,484,196 | B1 | 11/2002 | Maurille |
| 6,493,692 | B1 | 12/2002 | Kobayashi et al. |
| 6,493,705 | B1 | 12/2002 | Kobayashi et al. |
| 6,501,834 | B1 | 12/2002 | Milewski et al. |
| 6,505,197 | B1 | 1/2003 | Sundaresan et al. |
| 6,507,845 | B1 | 1/2003 | Cohen et al. |
| 6,507,866 | B1 | 1/2003 | Barchi |
| 6,519,602 | B2 | 2/2003 | Sundaresan et al. |
| 6,525,747 | B1 | 2/2003 | Bezos |
| 6,526,400 | B1 | 2/2003 | Takata et al. |
| 6,529,475 | B1 | 3/2003 | Wan et al. |
| 6,535,586 | B1 | 3/2003 | Cloutier et al. |
| 6,539,421 | B1 | 3/2003 | Appelman et al. |
| 6,545,722 | B1 | 4/2003 | Schultheiss et al. |
| 6,546,002 | B1 * | 4/2003 | Kim ............................. 370/351 |
| 6,549,937 | B1 * | 4/2003 | Auerbach ............. H04L 12/581 |
| | | | 709/206 |
| 6,557,027 | B1 | 4/2003 | Cragun |
| 6,559,863 | B1 | 5/2003 | Megiddo |
| 6,564,248 | B1 | 5/2003 | Budge et al. |
| 6,564,261 | B1 | 5/2003 | Gudjonsson et al. |
| 6,567,801 | B1 | 5/2003 | Chiang et al. |
| 6,571,234 | B1 | 5/2003 | Knight et al. |
| 6,574,599 | B1 | 6/2003 | Lim et al. |
| 6,580,790 | B1 * | 6/2003 | Henry ................. H04M 3/4931 |
| | | | 379/201.01 |

(56) References Cited

U.S. PATENT DOCUMENTS

| | | |
|---|---|---|
| 6,584,469 B1 | 6/2003 | Chiang et al. |
| 6,606,647 B2 | 8/2003 | Shah et al. |
| 6,615,241 B1 | 9/2003 | Miller et al. |
| 6,618,747 B1 | 9/2003 | Flynn et al. |
| 6,636,733 B1 | 10/2003 | Helferich |
| 6,640,230 B1 | 10/2003 | Alexander et al. |
| 6,651,058 B1 | 11/2003 | Sundaresan et al. |
| 6,654,683 B2 | 11/2003 | Jin et al. |
| 6,654,741 B1 | 11/2003 | Cohen et al. |
| 6,658,623 B1 | 12/2003 | Schilit et al. |
| 6,665,665 B1 | 12/2003 | Ponte |
| 6,671,508 B1 | 12/2003 | Sugano et al. |
| 6,671,714 B1* | 12/2003 | Weyer et al. .............. 709/203 |
| 6,677,968 B1 | 1/2004 | Appelman |
| 6,677,976 B2 | 1/2004 | Parker et al. |
| 6,678,719 B1* | 1/2004 | Stimmel .............. 709/204 |
| 6,685,475 B1 | 2/2004 | Maruyama et al. |
| 6,691,162 B1 | 2/2004 | Wick |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,718,313 B1 | 4/2004 | Lent et al. |
| 6,731,308 B1* | 5/2004 | Tang et al. .............. 715/751 |
| 6,732,155 B2 | 5/2004 | Meek |
| 6,738,822 B2 | 5/2004 | Fukasawa et al. |
| 6,747,970 B1 | 6/2004 | Lamb et al. |
| 6,748,421 B1 | 6/2004 | Ozkan et al. |
| 6,750,881 B1 | 6/2004 | Appelman |
| 6,751,777 B2 | 6/2004 | Bates et al. |
| 6,757,365 B1 | 6/2004 | Bogard |
| 6,757,732 B1 | 6/2004 | Sollee et al. |
| 6,763,373 B2 | 7/2004 | Shiigi |
| 6,772,188 B1 | 8/2004 | Cloutier |
| 6,772,196 B1 | 8/2004 | Kirsch et al. |
| 6,781,608 B1 | 8/2004 | Crawford |
| 6,785,554 B1 | 8/2004 | Amerga |
| 6,785,681 B2 | 8/2004 | Keskar et al. |
| 6,785,781 B2 | 8/2004 | Leenstra et al. |
| 6,788,769 B1 | 9/2004 | Waites |
| 6,795,853 B1* | 9/2004 | Snover .............. 709/220 |
| 6,795,863 B1 | 9/2004 | Doty |
| 6,799,039 B2 | 9/2004 | Wu et al. |
| 6,800,031 B2 | 10/2004 | Di Cesare |
| 6,807,574 B1 | 10/2004 | Partovi et al. |
| 6,834,276 B1 | 12/2004 | Jensen et al. |
| 6,839,737 B1 | 1/2005 | Friskel |
| 6,857,006 B1 | 2/2005 | Nishizawa |
| 6,862,710 B1 | 3/2005 | Marchisio |
| 6,879,665 B1 | 4/2005 | Cook et al. |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appelman et al. |
| 6,917,965 B2 | 7/2005 | Gupta et al. |
| 6,920,478 B2 | 7/2005 | Mendiola et al. |
| 6,941,345 B1 | 9/2005 | Kapil et al. |
| 6,952,279 B1 | 10/2005 | Iida |
| 6,968,179 B1 | 11/2005 | De Vries |
| 6,975,719 B1 | 12/2005 | Gao et al. |
| 6,976,209 B1 | 12/2005 | Storisteanu et al. |
| 6,993,564 B2 | 1/2006 | Whitten, II |
| 6,996,520 B2 | 2/2006 | Levin |
| 7,003,719 B1 | 2/2006 | Rosenoff et al. |
| 7,035,865 B2 | 4/2006 | Doss et al. |
| 7,035,923 B1 | 4/2006 | Yoakum et al. |
| 7,039,676 B1 | 5/2006 | Day et al. |
| 7,043,530 B2 | 5/2006 | Isaacs et al. |
| 7,058,036 B1 | 6/2006 | Yu et al. |
| 7,058,690 B2 | 6/2006 | Maehiro |
| 7,065,186 B1 | 6/2006 | Myers et al. |
| 7,076,546 B1* | 7/2006 | Bates et al. .............. 709/224 |
| 7,082,047 B2 | 7/2006 | Chow |
| 7,082,407 B1 | 7/2006 | Bezos et al. |
| 7,100,116 B1 | 8/2006 | Shafrir et al. |
| 7,103,846 B1 | 9/2006 | Shafrir et al. |
| 7,107,526 B1 | 9/2006 | Weller |
| 7,110,510 B1 | 9/2006 | Shaffer et al. |
| 7,120,687 B1 | 10/2006 | Tessman, Jr. et al. |
| 7,120,871 B1 | 10/2006 | Harrington |
| 7,124,123 B1 | 10/2006 | Roskind et al. |
| 7,127,232 B2 | 10/2006 | O'Neil et al. |
| 7,143,356 B1 | 11/2006 | Shafrir et al. |
| 7,149,208 B2* | 12/2006 | Mattaway et al. .............. 370/352 |
| 7,165,213 B1 | 1/2007 | Busey et al. |
| 7,171,473 B1 | 1/2007 | Eftis et al. |
| 7,177,880 B2 | 2/2007 | Ruvolo |
| 7,185,059 B2 | 2/2007 | Daniell et al. |
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,222,156 B2 | 5/2007 | Gupta et al. |
| 7,233,992 B1 | 6/2007 | Muldoon et al. |
| 7,263,526 B1 | 8/2007 | Busey et al. |
| 7,275,206 B1 | 9/2007 | Bates et al. |
| 7,275,215 B2 | 9/2007 | Werndorfer et al. |
| 7,277,912 B2 | 10/2007 | Corboy et al. |
| 7,313,760 B2 | 12/2007 | Grossman et al. |
| 7,366,764 B1 | 4/2008 | Vollebregt |
| 7,436,780 B2 | 10/2008 | Stephens et al. |
| 7,437,413 B2 | 10/2008 | Okuyama et al. |
| 7,512,407 B2 | 3/2009 | Wu et al. |
| 7,512,652 B1 | 3/2009 | Appelman et al. |
| 7,525,951 B2 | 4/2009 | Musil et al. |
| 7,603,411 B1 | 10/2009 | Davies et al. |
| 7,686,693 B2* | 3/2010 | Danieli et al. .............. 463/42 |
| 7,765,484 B2 | 7/2010 | Roskind |
| 7,949,722 B1 | 5/2011 | Ullman et al. |
| 7,979,802 B1 | 7/2011 | Appelman |
| 8,001,190 B2 | 8/2011 | Bernstein |
| 8,122,363 B1 | 2/2012 | Appelman |
| 8,132,110 B1 | 3/2012 | Appelman et al. |
| 8,275,661 B1 | 9/2012 | Ponte et al. |
| 8,474,628 B1 | 7/2013 | Appelman |
| 2001/0005861 A1 | 6/2001 | Mousseau et al. |
| 2001/0013050 A1 | 8/2001 | Shah |
| 2001/0044828 A1 | 11/2001 | Kikinis |
| 2002/0015061 A1 | 2/2002 | Maguire |
| 2002/0021307 A1* | 2/2002 | Glenn et al. .............. 345/753 |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0049717 A1 | 4/2002 | Routtenberg et al. |
| 2002/0056123 A1 | 5/2002 | Liwerant et al. |
| 2002/0065856 A1 | 5/2002 | Kisiel |
| 2002/0065894 A1 | 5/2002 | Dalal et al. |
| 2002/0069223 A1 | 6/2002 | Goodisman et al. |
| 2002/0077080 A1 | 6/2002 | Greene |
| 2002/0083136 A1 | 6/2002 | Whitten, II |
| 2002/0091667 A1 | 7/2002 | Jaipuria et al. |
| 2002/0103801 A1 | 8/2002 | Lyons |
| 2002/0112181 A1 | 8/2002 | Smith |
| 2002/0116463 A1 | 8/2002 | Hart |
| 2002/0116641 A1 | 8/2002 | Mastrianni |
| 2002/0130904 A1 | 9/2002 | Becker et al. |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0154210 A1 | 10/2002 | Ludwig et al. |
| 2002/0174010 A1 | 11/2002 | Rice, III |
| 2002/0175953 A1 | 11/2002 | Lin |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0009385 A1 | 1/2003 | Tucciarone et al. |
| 2003/0009523 A1 | 1/2003 | Lindskog et al. |
| 2003/0012348 A1 | 1/2003 | Skladman et al. |
| 2003/0018726 A1 | 1/2003 | Low et al. |
| 2003/0023875 A1 | 1/2003 | Hursey et al. |

(56) References Cited

U.S. PATENT DOCUMENTS

| | | |
|---|---|---|
| 2003/0028524 A1 | 2/2003 | Keskar et al. |
| 2003/0028595 A1 | 2/2003 | Vogt et al. |
| 2003/0037112 A1 | 2/2003 | Fitzpatrick et al. |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0069874 A1 | 4/2003 | Hertzog et al. |
| 2003/0079024 A1 | 4/2003 | Hough et al. |
| 2003/0084103 A1 | 5/2003 | Weineret et al. |
| 2003/0093580 A1 | 5/2003 | Thomas et al. |
| 2003/0097361 A1 | 5/2003 | Huang et al. |
| 2003/0105822 A1 | 6/2003 | Gusler et al. |
| 2003/0131061 A1 | 7/2003 | Newton et al. |
| 2003/0140103 A1 | 7/2003 | Szeto et al. |
| 2003/0167324 A1 | 9/2003 | Farnham et al. |
| 2003/0182394 A1 | 9/2003 | Ryngler et al. |
| 2003/0187813 A1 | 10/2003 | Goldman et al. |
| 2003/0212804 A1 | 11/2003 | Hashemi |
| 2003/0217073 A1 | 11/2003 | Walther et al. |
| 2003/0225834 A1 | 12/2003 | Lee et al. |
| 2003/0225847 A1 | 12/2003 | Heikes et al. |
| 2003/0236835 A1 | 12/2003 | Levi et al. |
| 2004/0015548 A1 | 1/2004 | Lee |
| 2004/0017396 A1 | 1/2004 | Werndorfer et al. |
| 2004/0039779 A1* | 2/2004 | Amstrong ............ G06Q 10/10 709/204 |
| 2004/0054729 A1 | 3/2004 | Fukuizumi et al. |
| 2004/0056901 A1 | 3/2004 | March et al. |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo |
| 2004/0128356 A1 | 7/2004 | Bernstein et al. |
| 2004/0179039 A1 | 9/2004 | Blattner et al. |
| 2004/0186738 A1 | 9/2004 | Reisman |
| 2004/0210844 A1 | 10/2004 | Pettinati et al. |
| 2004/0215648 A1 | 10/2004 | Marshall |
| 2004/0215721 A1 | 10/2004 | Szeto et al. |
| 2004/0249899 A1 | 12/2004 | Shiigi |
| 2004/0260762 A1 | 12/2004 | Fish |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0027716 A1 | 2/2005 | Apfel |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Gusler et al. |
| 2005/0060377 A1 | 3/2005 | Lo et al. |
| 2005/0076241 A1 | 4/2005 | Appelman |
| 2005/0080863 A1 | 4/2005 | Danielf |
| 2005/0086211 A1 | 4/2005 | Mayer |
| 2005/0102202 A1 | 5/2005 | Linden et al. |
| 2005/0114229 A1 | 5/2005 | Ackley et al. |
| 2005/0153681 A1 | 7/2005 | Hanson |
| 2005/0197846 A1 | 9/2005 | Pezaris |
| 2005/0198173 A1 | 9/2005 | Evans |
| 2006/0075044 A1 | 4/2006 | Fox et al. |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0212561 A1 | 9/2006 | Feng |
| 2006/0277187 A1 | 12/2006 | Roese et al. |
| 2007/0156664 A1 | 7/2007 | Norton et al. |
| 2008/0082620 A1 | 4/2008 | Barsness |
| 2008/0222533 A1 | 9/2008 | Hankejh et al. |
| 2009/0089316 A1 | 4/2009 | Kogan et al. |
| 2010/0184517 A1 | 7/2010 | Danieli et al. |
| 2011/0231507 A1 | 9/2011 | Appelman |
| 2012/0030295 A1 | 2/2012 | Bernstein |
| 2013/0054712 A1 | 2/2013 | Appelman |
| 2013/0067339 A1 | 3/2013 | Appelman |
| 2013/0067340 A1 | 3/2013 | Appelman |
| 2013/0067341 A1 | 3/2013 | Appelman |
| 2013/0073645 A1 | 3/2013 | Appelman |
| 2013/0073646 A1 | 3/2013 | Appelman |
| 2013/0073647 A1 | 3/2013 | Appelman |
| 2013/0073648 A1 | 3/2013 | Appelman |
| 2013/0073651 A1 | 3/2013 | Appelman |
| 2013/0073652 A1 | 3/2013 | Appelman |
| 2013/0124650 A1 | 5/2013 | Bernstein |
| 2013/0275526 A1 | 10/2013 | Appelman |
| 2013/0332957 A1 | 12/2013 | DeWeese et al. |
| 2015/0113440 A1 | 4/2015 | Appelman |
| 2015/0222575 A1 | 8/2015 | Appelman |

FOREIGN PATENT DOCUMENTS

| | | |
|---|---|---|
| GB | 2319137 | 5/1998 |
| GB | 2357932 A | 7/2001 |
| GB | 2368747 | 5/2002 |
| JP | 8-314826 | 11/1996 |
| JP | 2000-049901 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/14234 | 4/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/16201 | 3/2000 |
| WO | WO 00/24154 | 4/2000 |
| WO | WO 00/60809 | 10/2000 |
| WO | WO 00/79396 | 12/2000 |
| WO | WO 01/06748 A1 | 1/2001 |
| WO | WO 01/22258 | 3/2001 |
| WO | WO 01/24036 | 4/2001 |
| WO | WO 01/43357 | 5/2001 |
| WO | WO 01/67787 | 9/2001 |
| WO | WO 01/72020 | 9/2001 |
| WO | WO 01/80079 | 10/2001 |
| WO | WO 02/03216 A | 1/2002 |
| WO | WO 02/09437 | 1/2002 |
| WO | WO 02/35781 | 5/2002 |
| WO | WO 02/062039 | 8/2002 |
| WO | WO 02/073886 A1 | 9/2002 |
| WO | WO 2004/028178 | 4/2004 |
| WO | WO 2005/086723 | 9/2005 |

OTHER PUBLICATIONS

U.S. Appl. No. 13/397,568, Dec. 5, 2013, Office Action.
U.S. Appl. No. 13/616,678, Oct. 4, 2013, Office Action.
U.S. Appl. No. 13/616,678, Dec. 4, 2013, Advisory Action.
"About Internet directory services," Outlook 2000 SR-1 (90.0. 4527) Help File, on or before Aug. 10, 2001, p. 1.
"Active Directory," [online], [retrieved on May 13, 2013]. Retrieved from the Internet <http://www.microsoft.com/windows2000/technologies/directory/AD/default.asp>, pp. 1-13.
"Active Directory Features," [online], Jun. 15, 1999 [retrieved on May 13, 2003]. Retrieved from the Internet <http://www.microsoft.comwindows2000/server/evaluation/features/adlist.asp>, pp. 1-4.
"Active Directory Service Overview," [online], Nov. 30, 2001 [retrieved on May 13, 2003]. Retrieved from the Internet <http://www.microsoft.com/windows2000/server/evaluation/business/addatasheet.asp>, pp. 1-5.
Alan Cohen, "Instant Messaging," Apr. 13, 1999, PC Magazine, PC Labs, 2 pages.
"AOL Instant Messenger All New Version 2.0," 2 pages, Jun. 24, 1999.
"AOL Technology: Turning Complicated Things into Engaging Services," 1996 Annual Report, 22 pages.
"Benefits of Active Directory in a Windows 2000 Environment," [online], Sep. 20, 2001 [retrieved on May 13, 2003]. Retrieved from the Internet <http://www.microsoft.com/windows2000/server/evaluation/business/adwin2k.asp>, pp. 1-9.

(56) References Cited

OTHER PUBLICATIONS

"Directory Integration Can Lower Total Cost of Ownership and Increase Application Functionality," [online], Jul. 27, 1998 [retrieved on May 13, 2003]. Retrieved from the Internet <http://www.microsoft.com/presspass/press/1998/Jul98/ActivDPR.asp>, pages 1 of 4.
"Enterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims.asp?fra . . . >, pp. 1-16.
"Frequently Asked Questions About AOL Instant Messenger", 6 pages, Jun. 24, 1999.
"Integrating Applications with Windows 2000 and Active Directory," [online], Oct. 2000 [retrieved on May 8, 2003]. Retrieved from the Internet <http://www.microsoft.com/technet/prodtechnol/ad/windows2000/evaluate/adappstr.asp?fra . . . >, pp. 1-12.
"Integrating Microsoft Metadirectory Services and Active Directory," [online], Aug. 31, 2000 [retrieved on May 13, 2003]. Retrieved from the Internet <http://www.microsoft.com/windows2000/server/evaluation/news/bulletins/mmsma.asp>, p. 1.
"Introducing the Gordano Messaging Suite"; http://www.gordano.com; Copyright 1994-2003 Gordano, 3 pages.
J.C. Cannon, "Design Guide for Directory-Enabled Applications," [online], Apr. 2001 [retrieved on May 13, ]. Retrieved from the Internet <http://msdn.microsoft.com/library/en-us/dnactdir/html/deal.asp?frame=true>, pp. 1-18.
"Look up contact information from an item," Outlook 2000 SR-1 (9.0.0. 4527) Help File, on or before Aug. 10, 2001, p. 1.
Microsoft Corporation, "Active Directory Services Interface in the Microsoft Exchange 5.5 Environment," [online], Nov. 1997 [retrieved on May 13, 2003]. Retrieved from the Internet—http://msdn.microsoft.com/library/en-us/dnactdir/html/msdn adsiexch.asp?frame=true>, pp. 1-12.
Microsoft Corporation, "Comparing Microsoft Active Directory to Novell's NDS," [online], Sep. 1998 [retrieved on May 13, 2003], Retrieved from the Internet <http://msdn.microsoft.com/library/en-us/dnactdir/Titml/msdn_activedirvsnds.asp?frame =true>, pp. 1-17.
Microsoft Corporation, "Introduction to Active Directory Application Mode," Microsoft Windows Server 2003, Aug. 2002, pp. 1-13.
Microsoft Corporation, "Using ADSI, LDAP, and Network Management Functions With Active Directory," [online], Feb. 2002 [retrieved on May 13, 2003]. Retrieved from the Internet <http://msdn.microsoft.com/library/en-us/dnactdir/html/BuildingADApps.asp?frame-true>, pp. 1-9.
"New Features in AOL Instant Messenger for Windows v. 2.01 Beta," 2 pages, Apr. 28, 1999.
"Part I: Active Directory Operations," Active Directory Operations Guide, Microsoft Corporation, Microsoft Windows 2000, Version 1.5, pp. 1-187.
"Part II: Tasks and Procedures Appendices," Active Directory Operations Guide, Microsoft Corporation, Microsoft Windows 2000, Version 1.5, pp. 1-131.
"Set up LDAP directory services," Outlook 2000 SR-1 (9.0.0. 4527) Help File, on or before Aug. 10, 2001, p. 1.
"Quick Tips for Getting Started," 5 pages, Jun. 24, 1999.
"The LP Wireless Messenger," Messenger Documentation, [online], LP Wireless, Inc., 2001 [retrieved on Nov. 2, 2002]. Retrieved from the Internet <http://www.Ipwireless.com/messengerhelp.htm> pp. 1-7.
"Using Active Directory Service," from Chapter 5, Microsoft Windows 2000 Administrator's Pocket Consultant by William R. Stank (1999). Retrieved from http://www.microsoft.com/technet/prodtechnol/ad/windows2000/evaluate/05w2kadb.asp?fr . . . , pp. 1-6.
"What is AOL Instant Messenger," 3 pages, Jun. 24, 1999.
"What's new about exchanging information over the Internet," Outlook 2000 SR-1 (9.0.0.4527) Help File, on or before Aug. 10, 2001, p. 1.
"Windows 2000 Directory Services", [online] http://www.mircrosoft.com/windows2000/technologies/directory/default.asp,as of Nov. 25, 2001 according to Internet Archive Wayback Machine, available at http://web.archive.org/web20011625224156/http://www.microsoft.com/windowns2000/technologies/directory/default.asp, 1 page.
"Windows 2000 Directory Services," [online], [retrieved on May 13, 2003]. Retrieved from the Internet http://www.microsoft.com/windows2000/technologies/directory/default.asp, p. 1-2.
"Working with Active Directory Domains," from Chapter 5, Microsoft Windows 2000 Administrator's Pocket Consultant, by William R. Stank (1999). Retrieved from http://www.microsoft.com/technet/prodtechnol/ad/windows2000/evaluate/05w2kadb.asp?fr, pp. 1-10.
"YAHOO! Messenger Makes the World a Little Smaller, Moe Informed," pp. 1-2, Jun. 21, 1999.
Eschenburg, Wo laufen sie den?, Oct. 26, 1998, pp. 92-95.
Kohda et al., "IMPP: A New Instant Messaging Standard and Its Impact on Internet Business," Dec. 2000, Fujitsu Sci. Tech. J., 36 2, pp. 147-153.
Ed Bott and Ron Person, "Using Windows 95 with Internet Explorer 4.0," Feb. 17, 1998, Que, Special Edition.
America online Inc., "New AIM 4.7," Sep. 27, 2001, 2 pages, Internet: http://aim.aol.com.
America Online Inc., "AOL Instant Messenger," Aug. 29, 2000, 3 pages, Internet: www.aol.com/aim/.
CNET Networks Inc., "PopUp Killer," Sep. 13, 2001, 4 pages, Internet: download.cnet.com/downloads/0-10059-100-6932612.html.
WebmasterWorld.com Inc., "HTML and Browsers," Mar. 5, 2001, 3 pages, Internet: www.webmaster.com/forum21/367.htm.
Office Action, U.S. Appl. No. 10/146,814, dated Dec. 11, 2006, 15 pages.
Office Action, U.S. Appl. No. 09/843,788, dated Apr. 19, 2007, 17 pages.
Office Action, U.S. Appl. No. 10/146,814, dated Jul. 2, 2007, 18 pages.
International Search Report, Application Serial No. PCT/US05/45663, dated Apr. 11, 2008, 10 pages.
McKendrick, Joseph, "Internet Call Centers: New Era in Customer Service"; Feb. 2002; V10, n2, pp. 22(4).
International Search Report mailed Aug. 30, 2005 for International Application No. EP03731244, 8 pages.
Office Action, U.S. Appl. No. 10/184,002, dated Jan. 9, 2007, 16 pages.
U.S. Appl. No. 13/616,666, Feb. 14, 2014, Office Action.
U.S. Appl. No. 13/616,678, Dec. 24, 2013, Office Action.
U.S. Appl. No. 09/843,788, filed Apr. 30, 2001, Appelman.
"AOL Instant Messenger Windows Beta Features", Jun. 24, 1999, 2 pgs, AOL Instant Messenger All New Version 2.0,2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
William R. Stanek, Microsoft Windows 2000 Administrator's Pocket Consultant [online]. Microsoft Corporation, 1999 [retrieved on May 8, 2003]. Retrieved from the Internet <http://www.microsoft.com/technet/prodtechnol/ad/windows2000/evaluate/05w2kada.asp!fr . . . >, pp. 1-6.
International Search Report for International Application No. PCT/US03/15715 mailed Aug. 14, 2003.
European Search Report mailed Aug. 30, 2005 for European Application No. 03731244.
"A Countermeasure to Duplicate-detecting Anti-spam Techniques," Robert J. Hall, AT&T Labs Technical Report 99.9.1,1999, Abst. and pp. 1-26.
"A Reputation System for Peer-to-Peer Networks," Gupta et al., Jun. 1-3, 2003, NOSSDAV'03, Monterey, California, pp. 144-152.
"About File Transfers", AOL Instant Messenger, version 4.3, Help Documentation, available on Jul. 21, 2001, 5 pages.
"AOL Instant Messenger", reprinted from http://web.archive.org/web/20010721193059/http://aim.com/ (Way Back Machine_available on Jul. 21, 2001) on Aug. 26, 2005, 7 pages.
"BestCalls.com Announces the BestCalls Technology Index," Business Wire, Jun. 30,1999, Business Wire, p. 2.

(56) References Cited

OTHER PUBLICATIONS

"Better Bayesian Filtering," Paul Graham, Jan. 2003, pp. 1-11, http://www.paulgraham.co/better.html.
"Business at Cyberspeed; Brainstorm Becomes Quick Internet Hit," Walker, Jan. 24, 1999, The Washington Post, p. A.01 (4 total pages).
"Degrees of Separation Email Spam Protection," Halfbakery: Degrees of Separation Email Spam Protection, reprinted from http://halfbakery.com/idea/Degrees_20of_20Separation_20Emaii_20Protecti . . . printed on Mar. 1, 2004 (3 pages).
"Digital Artifacts for Remembering and Storytelling: Post History and Social Network Fragments," Viegas et al., retrieved from World Wide Web: http://we.media.mit.edu/~fviegas/papers/posthistory snf.pdf, 10 total pages (Jan. 2004).
"Finding Others Online: Reputation Systems for Social Online Spaces," Carlos Jensen et al., Apr. 20-25, 2002, CHI, Minneapolis, Minnesota, vol. 4, Issue 1, pp. 447-454.
"GLWebMail 2.0 is released!" http://www.gordano.com; available on Apr. 18, 2001, reprinted from http://web.archive org/web/20010418153714//http://www.gordano.com , 2 pages.
"Hottie or Nottie? Web Site Voters Let You Know Whether You Sizzle or Fizzle," Marino, Jul. 11, 2001, Florida Times Union, 2 pages.
"Icq.anywhere, Email Features—Email Center—ICQ.com," retrieved Apr. 29, 2004 from the World Wide Web: http://www.icq.com/email/popular-features.html, pp. 1-5.
"Idea for Online Networking Brings Two Entrepreneurs Together," Patents: Idea for Online Networking Brings Two Entrepreneurs Together, reprinted from http://nytimes.com/2003/12/01/technology/01patt.html!adxnnlx=0&adxnnix=107029 . . . , printed on Nov. 5, 2004, 2 pages.
"Instant Messaging for Gamers," PC Gamer, May 2004, vol. 11, No. 5, (2 pages).
"Learning Spam: Simple Techniques for Freely-Available Software," Bart Massey et al., Computer Science Dept., Portland, OR USA, 2003, pp. 1-14.
"Learning to Filter Spam E-Mail: A Comparison of a Naive Bayesian and a Memory-Based Approach," Ion Adroutsopoulos et al., University of Athens, Sep. 2000, pp. 1-12.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"PieSpy—Inferring and Visualizing Social Network on IRC," PieSpy Social Network Bot, reprinted from http://lister.linux-srv.anix.net/piespy printed on Mar. 11, 2004 (18 pages).
"plaxo," Plaxo, reprinted from http://web.archive.org/web/20041105072256/http://www.plaxo.com/ printed on Nov. 5, 2004 (available on Feb. 14, 2004) (2 pages).
"Plaxo-Update Your Address Book," Plaxo Contact Networks, reprinted from http://web.archive.org/web/20030218233638/http://www.plaxo.com/ printed on Nov. 5, 2004.(available on Feb. 18, 2003)(1 page).
"Reflections on Friendster, Trust and Intimacy," Danah Boyd. Ubicomp 2003, Workshop Application for the Intimate Ubiquitous Computing Workshop. Seattle, WA, Oct. 12-15, 2003, 4 pages.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging:" retrieved Apr. 29, 2004 from the World Wide Web: http://www.rimrod.com/software/rim1/Webmessenger-RIM-J2ME-Instant-Messaging-20 . . . . pp. 1-4.
"Six Degrees—New Programs Help Companies 'Mine Workers' Relationships for Key Business Prospects," William M. Bulkeley et al., Marketplace, The Wall Street Journal, Aug. 4, 2003. (3 pages).
"Social Nets Find Friends in VCs." Joanna Glasner. http://www.wired.com/news , Nov. 17, 2003, pp. 1-3.
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).

"Social Networking for Business: Release 0.5," Esther Dyson, Esther Dyson's Monthly Report, vol. 21, No. 10; Nov. 25, 2003, www.edventure.com. (36 pages).
"Social Social Networks: Deodorant for the Soul?," Esther Dyson, Esther Dyson's Monthly Report, vol. 21, No. 11, Dec. 12, 2003, www.edventure.com, (36 pages).
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004 (3 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).
"Support Vector Machines for Spam Categorization," Harris Drucker et al., IEEE Transactions on Neural Networks, vol. 10, No. 5, Sep. 1999, pp. 1048-1054.
"Support Vector Machines," Marti Hearst, IEEE Intelligent Systems, Jul./Aug. 1998, pp. 18-28.
"SVM-based Filtering of E-mail Spam with Content-specific Misclassification Costs," Aleksander Kolcz et al., TextDM'2001 (IEEE ICDM-2001 Workshop on Text Mining), San Jose. CA, 2001, pp. 1-14.
"SWF Seeks Attractive Head Shot; To Stand Out, Online Daters Pay for Professional Photos; Cropping out the Ex-Wife," Leiber, Nov. 19, 2003, The Wall Street Journal, (1 page).
"Technical Solutions for Controlling Spam," Shane Hird, Proceedings of AUUG2002, Melbourne, Sep. 4-6, 2002, (17 pages).
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Telstra targets Net spammers," J. Dudley, news.com.au, Dec. 2, 2003, (2 pages).
"Text Categorization with Support Vector Machines: Learning with Many Relevant Features," Thorsten Joachims, University of Dortmund, Computer Science Dept., LS-8 Report 23, 1998, (18 pages).
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
Trillian Discussion Forums—HOWTO: import ICQ 2003a Contact List: retrieved Apr. 29, 2004 from the World Wide Web: http://trillian.cc/forums/showthread.php?s+&threadid=36475, pp. 1-2.
"Welcome to Huminity World of Connections," Huminity-Home, reprinted from http://web.archive.org/web/20030228131435/www.huminity. com/default. php?internationa . . . printed on Nov. 5, 2004 (available on Feb. 2103) (1 page).
"Will You Buy a Car From This Man?," Leander Kahney, Oct. 6, 2003. pp. 1-3.
Windows NetMeeting—Features, [Online], Jun. 17, 1999, XP002245623, Retrieved from the Internet: URL:http://www.microsoft.com/windows/NetMeeting/Features/default.ASP>, (8 pages).
Anand Ranganalhan et al., "ConChat: A Context-Aware Chat Program", 2002, Pervasive Computing, pp. 51-57.
Announce: Implementation of E-mail Spam Proposal, Maurice L. Marvin, news.admin.net-abuse.misc, Aug. 3, 1996,2 pages.
Anonymous: "Push to Talk™ Services", Internet Document, [Online], p. 1, Retrieved from the Internet: URL: http://www.nextel.com/services/directconnect/pttoverview.shtml [retrieved on Dec. 29, 2003].
Anonymous: "The Internet—the Advent of New Forms of Communication", Internet Document, [Online], pp. 1-4, Retrieved from the Internet: URL: http://journal.fujitsu.com/248e/e48now.html [retrieved on Dec. 29, 2003].
Archive.org archived "AOL Instant Messenger," [online] Jul. 21, 2001 [from file of U.S. Appl. No. 09/911,799] (7 pages).

(56) References Cited

OTHER PUBLICATIONS

Archive.org archived copy of the Morpheus 1.9.1 download page on CNet Download.com [online] Oct. 8, 2001 [from file of U.S. Appl. No. 09/911,799] (2 pages).
Archive.org archived MusicCity Morpheus download page on Cnet Download.com [online] Oct. 8, 2001 [from filed of U.S. Appl. No. 09/911,799] (2 pages).
Australian Office Action of Apr. 7, 2006, App. No. 2002340039 (2 pages).
BuddyGopher~About, available on Jul. 13, 2004, reprinted from http://web.archive.org/web/20040713002836/www.buddygopher.com/about.html on Sep. 28, 2005 (4 pgs).
BuddyGopher—We Love Away Messages!, "BuddyGopher simultaneously checks the away messages of your favorite AIM® buddies.", available on Sep. 24, 2004, reprinted from http://web.archive.org/web/200409241 04001/http://www.buddygopher.com/ on Sep. 28, 2005 (2 pages).
Canadian Office Action from Application Serial No. 2,403,520, dated Feb. 21, 2005 (2 pages).
Chinese Office Action of Jul. 7, 2006, App. No. 02821420X (5 pages).
International Search Report and Written Opinion dated Feb. 15, 2006 for International Application No. PCT/US05/07204, (10 pages).
Office Action mailed approximately Feb. 29, 2006 for Japanese Patent Application No. 2002-515026 (6 pages).
Supplementary European Search Report issued in European Application No. EP05728303, dated Jan. 9, 2009, (2 pages).
Courter et al., "Mastering Microsoft Outlook 2000 Premium Edition", Sybex Inc., Alameda, California, 2000, pp. 167-169, ISBN 0-7821-2676-6.
CrushParty.com: Help, retrieved Jun. 12, 2002 from the World Wide Web: http://www.crushparty.com/help.jsp, (3 pages).
Dodgeball.com:: mobile social software, "help: text messaging", available on Oct. 13, 2004, reprinted from http://web.archive.org/web/20041013034241/www.dodgeball.com/social/helptext.php on Sep. 28, 2005 (3 pgs).
Dodgeball.com:: mobile social software, "help: the basics", available on Oct. 9, 2004, reprinted from http://web.archive.org/web/20041009200739/www.dodgeball.com/social/helpbasics.php on Sep. 28, 2005(2 pgs).
Dodgeball.com:: mobile social software, "help: use it", available on Oct. 9, 2004, reprinted from http://web.archive.ora/web/20041009201853/www.dodgeball.com/social/help useit.php on Sep. 28, 2005(2 pgs).
Dodgeball.com:: mobile social software, "Hook up with friends. Discover what's around you", available on Nov. 30, 2003, reprinted from http://web.archive.org/web/20041130034344/www.dodgeball.com/social/index.phpon Sep. 28, 2005 (2 pgs).
Dutta-Roy Amitava, Virtual Meetings with Desktop Conferencing, IEEE Spectrum, vol. 35, No. 7, Jul. 1, 1998, pp. 47-56 and p. 66.
European Office Action in Application No. 01954931.0-2414, mailed Jul. 14, 2008, 3 pages.
European Patent Office, Communication of Aug. 30, 2005, App. No. 03731244.4-2416 (PCT/US0315715) (4 pages).
European Patent Office, Communication of Aug. 31, 2009, App. No. 02778374.5-1238 (8 pages).
European Patent Office, Communication of Sep. 5, 2006, App. No. 02778374.5-1238 (3 pages).
Examiner's Answer mailed Jan. 11, 2008 by USPTO in U.S. Appl. No. 09/810,159, 11 pages.
Home-tribe.net, http://washingtondc.tribe.net/message/24434d1b-817b-4580-aa42-3bffa15f26a?page=1, reprinted on Dec. 13, 2004), (2 pages).
http://www.friendster.com (reprinted on Dec. 13, 2004) (17 pages).
IBM "Configuring Sametime servers in your Domino environment" May 1, 2000 (14 pages).
International Search Report and Written Opinion for PCT Application No. PCT/US2005/042992, Mar. 6, 2007 (8 pages).
International Search Report dated Oct. 16, 2006, for PCT/US05/08476, (9 pages).

Opinion of International Search Authority, Application No. PCT/US05/45663, dated Apr. 11, 2008, (6 pages).
International Search Report, Application Serial No. PCT/US2006/018286, dated Oct. 19, 2006, (10 pages).
Isaacs, Ellen: "Example UI Spec: Sound Instant Messages", Internet Document, [Online], Retrieved from the Internet: URL: http://www.uidesigns.com/spec/d-sims.html [retrieved on Jun. 26, 2003](2 pages).
Japanese Office Action of May 12, 2008, App. No. 2003-533140 (5 pages).
Klaus Hartenstein et al., "xhtalk 2.9", © Nov. 1992, (6 pages).
Lotus sametime 1.5 1999 (4 pages).
Mariano, Gwendolyn. ZDNetNews. "Morpheus 1.9 to be unleashed", [online] Jun. 10, 2002 [from file of U.S. Appl. No. 09/911,799] (6 pages).
Mary Beth Marklein, "Student have 'away' with words", Mar. 28, 2004, USA Today, http://www.usatoday.com/tech/news/2004-03-28-aways-messages-usat_x.htm, 4 pages.
Matsumoto, Tatsuro et al.: "Chocoa Communicator—A New Communication System Based on Awareness and Text Communications—", FUJITSU Sci. Tech. J., 36, 2 pp. 154-161, Dec. 2000.
Mike Snider, "America goes online for New Year's bash", USA Today, Jan. 2, 2000 1 page.
Muller, Nathan, "Dial 1-800-Internet"; Feb. 1996, pp. 83-84, 86, 88.
Neo Mai, Ken Neo. "Buying and selling on the internet; [Computimes, 2* Edition]." New Straits Times. Kuala Lumpur: Jun. 28, 2001. 3 pages.
Office Action of Canadian Application No. 2,462,037, dated Feb. 12, 2009 (8 pages).
PCT International Search Report of Apr. 11, 2003, App. No. PCT/US00/35160 (3 pages).
PCT International Search Report of Jan. 9, 2003, App. No. PCT/US02/30730 (5 pages).
PowWow (Mar. 1, 2000), Introduction, Retrieved Apr. 3, 2006 from website: http://web.archive.org/web/20000301125635/ww2.tribal.com/help/online_docs/h205voic.html. (2 pages).
Pruitt, Scarlet. IDG News Service. "Morpheus Updates Peer-to-Peer Client" [online] Jun. 10, 2002 [accessed Feb. 14, 2007], Retrieved from Internet URL: http://www.pcworld.com/article/id_101736/article.html, (3 pages).
R. Movva & W. Lai, "MSN Messenger Service 1.0 Protocol", Aug. 1999. Internet Draft. http://tools.ietf.org/id/draft-movva-msn-messenger-protocol-oo.txt, (28 pages).
Reichard, K., "AOL, ICQ to Interoperate—But in a Limited Fashion," Oct. 30, 2002, Instant Messaging Planet, available at www.instantmessagingplanet.com/public/article.php/1490771, (4 pages).
Ryze home page, www.ryze.com, Dec. 21, 2003, available at http://web.archive.org/web/20031221010006/http://ryze.com, printed Mar. 16, 2005, (13 pages).
Satter, Michael, excerpts from Internet TV with CU-SeeMe, First Edition, including inside Title Page and Copyright Page; "Overview"; "Contents," through pp. xii; Chapter 1, "Introduction to Internet Videoconferencing and CU-SeeMe," pp. 1-12; Chapter 4, "Hardware," pp. 47-64; Chapter 5, "Software," pp. 65-92; Chapter 6, "CU-SeeMe User's Guide," pp. 93-121; Chapter 9, "Other Videoconferencing Technologies," pp. 201-226; Chapter 10, What the Future Holds, pp. 227-233; Appendix A, "Troubleshooting O&A," pp. 235-249; published by Sams.net Publishing, 201 W. 103rd St., Indianapolis, IN 46290, International Standard Book Number: 1-57521-006-1, Library of Congress Catalog Card Number: 95-70178, copyright © 1995.
Takashi Yoshmoet al., "Namba: Location-Aware Collaboration System for Shopping and Meeting", Aug. 2002, IEEE Transactions on Consumer Electronics, pp. 470-47.
Tribal Voice, PowWow Guided Tour—Step 6, PowWow personal communication http://web.archive.org/web/2000817094516/www.tribal.com/powwow/tour/step6.cfm (Oct. 22, 1999), (2 pages).
VisiblePath webpages, www.visiblepath.org, Dec. 3, 2003, available at http://web.archive.org/web/20031203132211/http://www.visiblepath.com. printed Mar. 16, 2005, (5 pages).
Wayner, Peter, "Hey Baby, Call Me at My IP Address", Apr. 1996, pp. 142-144.

(56) References Cited

OTHER PUBLICATIONS

WBWE (199B), PowWow 3.6 Brings the Power of Internet Community to the People, Business Wire, (2 pages).
William R. Stanek, Microsoft Windows 2000 Administrator's Pocket Consultant [online]. Microsoft Corporation, 1999 [retrieved on May 8, 2003]. Retrieved from the Internet <http://www.microsoft.com/technet/prodtechnol/ad/windows2000/evaluate/05w2kadb.asp?fra . . . >, pp. 1-10.
Wingfield, N., "Technology Journal: Changing Chat—Instant Messaging is Taking Off, and for some Users It's Nuzzling Out the Phone", Asian Wall Street Journal, New York, NY, Sep. 25, 2000, (5 pages).
Yubing Wang, Mark Claypool, Zheng Zuo. Video: An empirical study of realvideo performance across the internet. Proceedings of the 1st ACM SIGCOMM Workshop on Internet Measurement IMW' Nov. 1, 2001. ACM Press. (15 pages).
ZeroDegrees home page, www.zerodegrees.com, Jan. 24, 2004, available at http://web.archive.org/web/20040204153037/www.zerodegrees.com/home.htm, printed Mar. 16, 2005, (2 pages).
U.S. Appl. No. 09/810,159, Jul. 6, 2004, Office Action.
U.S. Appl. No. 09/810,159, Feb. 11, 2005, Office Action.
U.S. Appl. No. 09/810,159, Jun. 15, 2005, Office Action.
U.S. Appl. No. 09/810,159, Dec. 2, 2005, Office Action.
U.S. Appl. No. 09/810,159, Apr. 19, 2006, Office Action.
U.S. Appl. No. 09/810,159, Jan. 11, 2008, Office Action.
U.S. Appl. No. 09/810,159, Jan. 29, 2010, Office Action.
U.S. Appl. No. 09/843,788, Mar. 30, 2004, Office Action.
U.S. Appl. No. 09/843,788, Dec. 2, 2004, Office Action.
U.S. Appl. No. 09/843,788, Jul. 27, 2005, Office Action.
U.S. Appl. No. 09/843,788, Mar. 28, 2006, Office Action.
U.S. Appl. No. 09/843,788, Jun. 12, 2006, Office Action.
U.S. Appl. No. 09/843,788, Oct. 31, 2007, Office Action.
U.S. Appl. No. 09/843,788, Sep. 15, 2008, Office Action.
U.S. Appl. No. 09/843,788, May 5, 2010, Office Action.
U.S. Appl. No. 09/848,231, Mar. 30, 2004, Office Action.
U.S. Appl. No. 09/848,231, May 5, 2005, Office Action.
U.S. Appl. No. 09/848,231, Jun. 3, 2011, Office Action.
U.S. Appl. No. 09/848,231, Oct. 12, 2011, Notice of Allowance.
U.S. Appl. No. 09/848,232, Aug. 19, 2004, Notice of Allowance.
U.S. Appl. No. 09/848,232, Mar. 10, 2005, Notice of Allowance.
U.S. Appl. No. 09/911,799, Oct. 5, 2004, Office Action.
U.S. Appl. No. 09/911,799, Apr. 29, 2005, Office Action.
U.S. Appl. No. 09/911,799, Nov. 17, 2005, Office Action.
U.S. Appl. No. 09/911,799, Aug. 11, 2006, Office Action.
U.S. Appl. No. 09/911,799, Jul. 3, 2007, Office Action.
U.S. Appl. No. 09/911,799, Dec. 1, 2008, Office Action.
U.S. Appl. No. 09/911,799, Mar. 18, 2009, Office Action.
U.S. Appl. No. 09/911,799, Mar. 18, 2010, Office Action.
U.S. Appl. No. 10/134,437, Nov. 1, 2005, Office Action.
U.S. Appl. No. 10/134,437, May 18, 2006, Office Action.
U.S. Appl. No. 10/134,437, Aug. 21, 2006, Office Action.
U.S. Appl. No. 10/134,437, Sep. 6, 2007, Office Action.
U.S. Appl. No. 10/134,437, Feb. 11, 2008, Office Action.
U.S. Appl. No. 10/134,437, Sep. 18, 2008, Office Action.
U.S. Appl. No. 10/134,437, Mar. 10, 2009, Office Action.
U.S. Appl. No. 10/134,437, Oct. 2, 2009, Notice of Allowance.
U.S. Appl. No. 10/134,437, Nov. 17, 2009, Notice of Allowance.
U.S. Appl. No. 10/146,814, Sep. 20, 2005, Office Action.
U.S. Appl. No. 10/146,814, May 22, 2006, Office Action.
U.S. Appl. No. 10/146,814, Apr. 15, 2008, Office Action.
U.S. Appl. No. 10/146,814, Mar. 22, 2010, Office Action.
U.S. Appl. No. 10/146,814, Oct. 1, 2010, Notice of Allowance.
U.S. Appl. No. 10/146,814, Jan. 20, 2011, Notice of Allowance.
U.S. Appl. No. 10/184,002, Aug. 25, 2005, Office Action.
U.S. Appl. No. 10/184,002, Apr. 20, 2006, Office Action.
U.S. Appl. No. 10/184,002, Jan. 8, 2008, Office Action.
U.S. Appl. No. 10/184,002, Jul. 24, 2008, Notice of Allowance.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056 Nov. 5, 2007, Office Action.
U.S. Appl. No. 10/334,056, May 12, 2008, Office Action.
U.S. Appl. No. 10/633,636, Oct. 11, 2006, Office Action.
U.S. Appl. No. 10/633,636, Jun. 20, 2007, Office Action.
U.S. Appl. No. 10/633,636, May 25, 2010, Office Action.
U.S. Appl. No. 10/633,636, Nov. 9, 2010, Office Action.
U.S. Appl. No. 10/633,636, Oct. 27, 2011, Notice of Allowance.
U.S. Appl. No. 10/747,623, Mar. 13, 2007, Office Action.
U.S. Appl. No. 10/747,623, Aug. 21, 2007, Office Action.
U.S. Appl. No. 10/747,623, Nov. 14, 2007, Office Action.
U.S. Appl. No. 10/747,623, Jun. 23, 2008, Office Action.
U.S. Appl. No. 10/747,624, Feb. 26, 2007, Office Action.
U.S. Appl. No. 10/747,624, Jul. 16, 2007, Office Action.
U.S. Appl. No. 10/747,624, Nov. 1, 2007, Office Action.
U.S. Appl. No. 10/747,679, Oct. 2, 2007, Office Action.
U.S. Appl. No. 10/747,679, Apr. 29, 2008, Office Action.
U.S. Appl. No. 10/981,460, Aug. 20, 2008, Office Action.
U.S. Appl. No. 11/015,424, Mar. 19, 2008, Office Action.
U.S. Appl. No. 11/015,424, Nov. 3, 2008, Office Action.
U.S. Appl. No. 11/015,424, May 1, 2009, Office Action.
U.S. Appl. No. 11/015,424, Oct. 19, 2009, Office Action.
U.S. Appl. No. 11/017,204, Dec. 12, 2007, Office Action.
U.S. Appl. No. 11/017,204, Junl 23, 2008, Office Action.
U.S. Appl. No. 11/150,180, Oct. 2, 2007, Office Action.
U.S. Appl. No. 11/150,180, Apr. 7, 2008, Office Action.
U.S. Appl. No. 11/150,180, Nov. 5, 2008, Office Action.
U.S. Appl. No. 11/150,180, Aug. 19, 2009, Office Action.
U.S. Appl. No. 11/150,180, Sep. 27, 2011, Notice of Allowance.
U.S. Appl. No. 11/150,180, Sep. 11, 2012, Notice of Allowance.
U.S. Appl. No. 11/150,180, Mar. 28, 2013, Notice of Allowance.
U.S. Appl. No. 11/150,180, Jun. 6, 2013, Notice of Allowance.
U.S. Appl. No. 11/237,718, Apr. 2, 2009, Office Action.
U.S. Appl. No. 11/237,718, Oct. 30, 2009, Office Action.
U.S. Appl. No. 11/238,110, Nov. 29, 2007, Office Action.
U.S. Appl. No. 11/238,110, Jul. 9, 2008, Office Action.
U.S. Appl. No. 11/238,110, Oct. 9, 2008, Office Action.
U.S. Appl. No. 11/238,129, Nov. 14, 2007, Office Action.
U.S. Appl. No. 11/238,129, May 28, 2008, Office Action.
U.S. Appl. No. 11/238,130, Jul. 3, 2008, Office Action.
U.S. Appl. No. 11/238,130, Nov. 13, 2008, Office Action.
U.S. Appl. No. 11/238,130, Apr. 14, 2009, Office Action.
U.S. Appl. No. 11/238,130, Nov. 24, 2009, Office Action.
U.S. Appl. No. 12/336,880, Aug. 4, 2010, Office Action.
U.S. Appl. No. 13/397,568, May 9, 2013, Office Action.
U.S. Appl. No. 13/616,666, Apr. 1, 2013, Office Action.
U.S. Appl. No. 13/616,678, Mar. 27, 2013, Office Action.
U.S. Appl. No. 13/616,692, Mar. 27, 2013, Office Action.
Dictionary.com, http://dictionary.reference/browser/dialogue, Dec. 8, 2007, 1 page.
International Search Report issued in PCT/US01/20381, dated Dec. 4, 2002.
U.S. Appl. No. 10/311,259, Jun. 26, 2006, Office Action.
U.S. Appl. No. 10/311,259, Jan. 25, 2007, Office Action.
U.S. Appl. No. 10/311,259, Apr. 16, 2007, Office Action.
U.S. Appl. No. 10/311,259, Dec. 12, 2007, Office Action.
U.S. Appl. No. 10/311,259, Mar. 19, 2008, Office Action.
U.S. Appl. No. 10/311,259, Oct. 16, 2008, Office Action.
U.S. Appl. No. 10/311,259, Apr. 27, 2009, Office Action.
U.S. Appl. No. 10/311,259, Nov. 25, 2009, Office Action.
U.S. Appl. No. 10/311,259, Mar. 18, 2010, Office Action.
U.S. Appl. No. 10/311,259, Sep. 7, 2010, Office Action.
U.S. Appl. No. 10/311,259, Dec. 22, 2010, Office Action.
U.S. Appl. No. 10/311,259, Apr. 5, 2011, Notice of Allowance.
U.S. Appl. No. 13/175,410, Dec. 20, 2011, Office Action.
U.S. Appl. No. 13/175,410, Apr. 3, 2012, Office Action.
U.S. Appl. No. 13/175,410, Aug. 10, 2012, Office Action.
U.S. Appl. No. 13/175,410, Apr. 1, 2013, Office Action.
U.S. Appl. No. 13/175,410, Jul. 1, 2013, Office Action.
U.S. Appl. No. 13/175,410, Oct. 10, 2013, Office Action.
U.S. Appl. No. 13/397,568, Jun. 6, 2014, Office Action.
U.S. Appl. No. 13/620,985, Jun. 17, 2013, Office Action.

(56) References Cited

OTHER PUBLICATIONS

U.S. Appl. No. 13/620,985, Nov. 8, 2013, Office Action.
U.S. Appl. No. 13/620,985, Mar. 12, 2014, Office Action.
U.S. Appl. No. 13/149,368, Jul. 7, 2014, Office Action.
U.S. Appl. No. 13/149,368, Oct. 24, 2014, Office Action.
U.S. Appl. No. 13/397,568, Oct. 6, 2014, Notice of Allowance.
U.S. Appl. No. 13/616,734, Oct. 24, 2013, Office Action.
U.S. Appl. No. 13/617,413, Oct. 24, 2013, Office Action.
U.S. Appl. No. 13/616,666, Aug. 13, 2014, Office Action.
U.S. Appl. No. 13/616,678, Sep. 2, 2014, Office Action.
U.S. Appl. No. 13/620,985, Sep. 19, 2014, Office Action.
U.S. Appl. No. 13/149,368, Mar. 16, 2015, Office Action.
U.S. Appl. No.13/616,707, Feb. 12, 2015, Office Action.
U.S. Appl. No. 13/616,734, Feb. 12, 2015, Office Action.
U.S. Appl. No. 13/617,413, Feb. 12, 2015, Office Action.
U.S. Appl. No. 13/616,666, Feb. 23, 2015, Notice of Allowance.
U.S. Appl. No. 13/616,678, Feb. 12, 2015, Notice of Allowance.
U.S. Appl. No. 13/616,707, Nov. 20, 2014, Office Action.
U.S. Appl. No. 13/616,666, Jan. 12, 2015, Notice of Allowance.
U.S. Appl. No. 13/616,678, Dec. 12, 2014, Notice of Allowance.
U.S. Appl. No. 13/617,413, Aug. 13, 2015, Office Action.
U.S. Appl. No. 14/586,793, Sep. 14, 2015, Office Action.
U.S. Appl. No. 14/702,516, filed May 1, 2015, Appelman.
U.S. Appl. No. 13/149,368, Jul. 30, 2015, Office Action.
U.S. Appl. No. 13/616,630, May 21, 2015, Office Action.
U.S. Appl. No. 13/616,707, Jul. 15, 2015, Office Action.
U.S. Appl. No. 13/616,734, Jul. 29, 2015, Office Action.
U.S. Appl. No. 13/617,374, May 21, 2015, Office Action.
U.S. Appl. No. 13/620,985, Jun. 30, 2015, Office Action.
U.S. Appl. No. 13/617,402, Jul. 28, 2015, Office Action.
U.S. Appl. No. 13/784,647, Jul. 23, 2015, Office Action.
U.S. Appl. No. 14/586,793, Jun. 19, 2015, Office Action.
U.S. Appl. No. 14/690,201, Jul. 30, 2015, Office Action.
U.S. Appl. No. 13/616,6310, Dec. 31, 2015, Office Action.
U.S. Appl. No. 13/616,707, Dec. 16, 2015, Office Action.
U.S. Appl. No. 13/616,734, Feb. 2, 2016, Office Action.
U.S. Appl. No. 13/617,413, Jan. 29, 2016, Notice of Allowance.
U.S. Appl. No. 13/617,374, Jan. 5, 2016, Office Action.
U.S. Appl. No. 13/620,985, Mar. 2, 2016, Notice of Allowance.
U.S. Appl. No. 13/617,402, Jan. 13, 2016, Office Action.
U.S. Appl. No. 13/784,647, Feb. 26, 2016, Office Action.

\* cited by examiner

INTELLIGENTLY ENABLED MENU CHOICES BASED ON ONLINE PRESENCE STATE IN ADDRESS BOOK

This application is a continuation of U.S. application Ser. No. 10/633,636, filed on Aug. 5, 2003, (now allowed), now U.S. Pat. No. 8,132,110 which is a continuation-in-part of U.S. application Ser. No. 09/848,231, filed May 4, 2001, (now U.S. Pat. No. 8,122,363), which claims priority to U.S. Provisional Application No. 60/201,738, filed on May 4, 2000, and U.S. Provisional Application No. 60/229,311, filed on Sep. 1, 2000. The contents of the above-referenced applications are expressly incorporated herein by reference in their entireties.

TECHNICAL FIELD

This description relates to intelligently enabling menu choices and more particularly to intelligently enabling menu choices based upon online presence state information.

BACKGROUND

Online service providers facilitate access to information and services by providing interactive user interfaces (UIs) that help users (e.g., subscribers) navigate to desired resources. For example, in the case of a system for communicating using instant messages (IMs), a UI allows a user to invoke actions, such as establishing a communications link, through the selection of screen objects such as icons, windows, and drop-down menus. The design of a UI has a significant impact on a user's online experience. In particular, the icons, the windows, and the menus of a UI may be arranged to enable a user to locate information and services quickly and easily.

SUMMARY

In one general aspect, a computer implemented method for intelligently enabling menu choices includes rendering, on a client system, an address book user interface comprising information related to one or more contacts, selecting a contact from the address book user interface, determining an online presence state for the selected contact, enabling one or more menu options based upon the determined online presence state, with the menu options enabled for a first online presence state differing from the menu options enabled for a second online presence state, and presenting the enabled menu options to a user in a user interface.

Implementations may include one or more of the following features. For example, the menu options may correspond to one or more available communications channels, and the available communications channels may include e-mail, chat, and/or instant messaging. Determining the online presence state may include receiving the online presence state from a host system, and the online presence state may include an online state, a mobile device usage state, an idle state, an away state, an offline state, and/or a not IM capable state.

A menu may be invoked for the selected contact. In one implementation, enabling the menu options may include enabling the menu options by retrieving a list of one or more pre-stored menu options associated with the determined online presence state. The menu options may be automatically determined by the client system or host system. In another implementation, the menu options may be enabled on-the-fly (e.g., dynamically enabled), and may be enabled automatically by the client system or by the host system. Enabling the menu options may include adding a control, making a control unavailable, removing a control, and changing a control.

Implementations of presenting the enabled menu options include presenting the determined online presence state for the contact, presenting the menu options in the address book user interface, and presenting only the enabled menu options in a user interface.

In another general aspect, a user interface enables perception of enabled menu choices and includes an address book application user interface that enables perception of information for one or more contacts for an address book user, a mechanism that determines an online presence state for one or more contacts, a mechanism that enables one or more menu options for a contact based upon the online presence state of the contact, with menu options enabled for a first online presence state differing from menu options enabled for a second online presence state, and a mechanism that presents the enabled menu options to the address book user.

Implementations may include one or more of the following. For example, the menu options may correspond to one or more available communications channels and the available communications channels may include e-mail, chat, and instant messaging. The mechanism that determines the online presence state includes a mechanism that receives the online presence state from a host system. The determined online presence state includes an online state, a mobile device usage state, an idle state, an away state, an offline state, and a not IM capable state.

In one implementation, the mechanism that enables the menu options may include a mechanism that enables the menu options by retrieving a list of one or more pre-stored menu options for the determined online presence state, and the menu options may be automatically enabled by the client system or the host system. In another implementation, the mechanism that enables the menu options includes a mechanism that enables the menu options on-the-fly. The mechanism that enables the menu options may include a mechanism that adds a control, a mechanism that makes a control unavailable, a mechanism that removes a control, and/or a mechanism that changes a control.

The mechanism that presents the enabled menu options may include a mechanism that presents the determined online presence state for the contact or a mechanism that presents only the enabled menu options. The mechanism that presents the enabled menu options may be, for example, the address book application user interface.

Aspects of the intelligently enabled menu choices may be implemented by an apparatus and/or by a computer program stored on a computer readable medium. The computer readable medium may comprise a disc, a client device, a host device, and/or a propagated signal. In addition, aspects of the intelligently enabled menu choices may be implemented in a client/host context or in a standalone or offline client device. The intelligently enabled menu choices may be rendered in a client/host context and may be accessed or updated through a remote device in a client/host environment. The intelligently enabled menu choices also may be rendered by the standalone/offline device and may be accessed or updated through a remote device in a non-client/host environment such as, for example, a LAN server serving an end user or a mainframe serving a terminal device.

Other features will be apparent from the following description, including the drawings, and from the claims.

For brevity, several elements in the figures described below are represented as monolithic entities. However, as would be understood by one skilled in the art, these elements each may include numerous interconnected computers and components designed to perform a set of specified operations and/or may be dedicated to a particular geographic region.

DETAILED DESCRIPTION

The described systems and techniques allow intelligently enabled menu choices to be made available to a user of an address book based upon the online presence state (online state) of a contact in the user's address book. An address book enables a user to communicate with any of the listed contacts using any of the available communications channels (e.g., communications schemes), such as, for example, e-mail, IM, telephone, and U.S. Mail. The user is not limited to viewing and contacting a subset of contacts sharing a common communication channel. Also, the contacts in the address book need not share any common communication channel. The available communications channels for communicating with a contact may differ depending on, for example, the instant messaging online presence state of the contact. Thus, using the address book, communications are enabled through available communication channels to any contact with whom the user is able to communicate.

Menu choices may be determined and presented to a user based on the online presence state of the contact. The determined menu choices may include choices for automatically presenting and configuring appropriate communications channels which may be used for communicating with a selected contact based upon the online presence of the selected contact. For example, certain menu choices may only be appropriate when a contact is online, and such choices will only be made available to the user when the contact is online. The choices made available to the user may depend on other available online states, such as an indication that the contact is using a mobile device, has been inactive for a certain period of time, has set an indication of being away or unavailable, has enabled or disabled the user's ability to detect the contact's presence, is offline, or does not have instant messaging capability. The online states available to the user typically depend upon the communications system being used.

Although online presence is discussed below primarily with respect to IM applications, other implementations are contemplated for providing similar online presence functionality in platforms and online applications such as chat applications or e-mail applications. The provision of such status in an address book or other non-communications application enables a user to focus on available actions with respect to the contacts themselves without needing to pay attention to any particular communications channel available to communicate with a particular contact.

Figure 1:
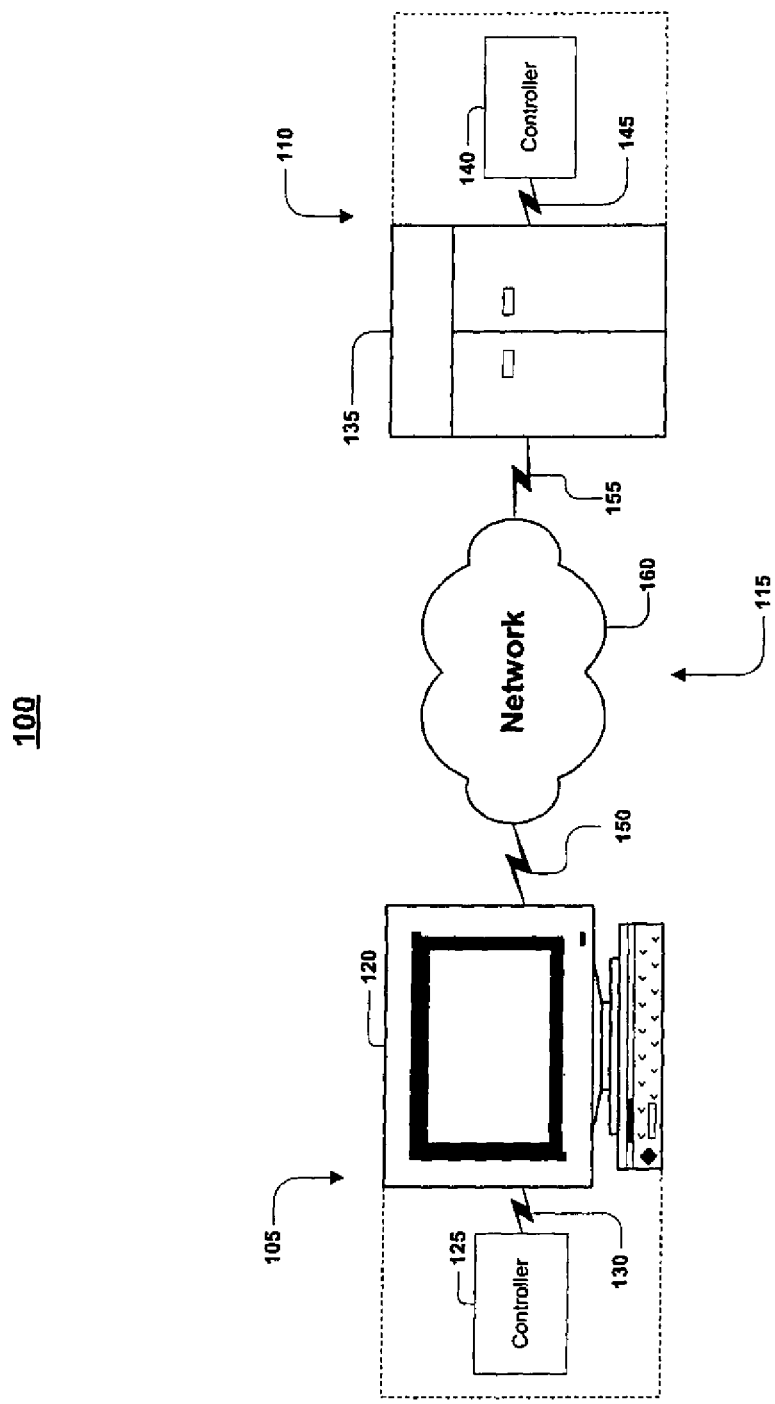
FIGS. 1-3 are block diagrams of an exemplary communications system.
Figure 2:
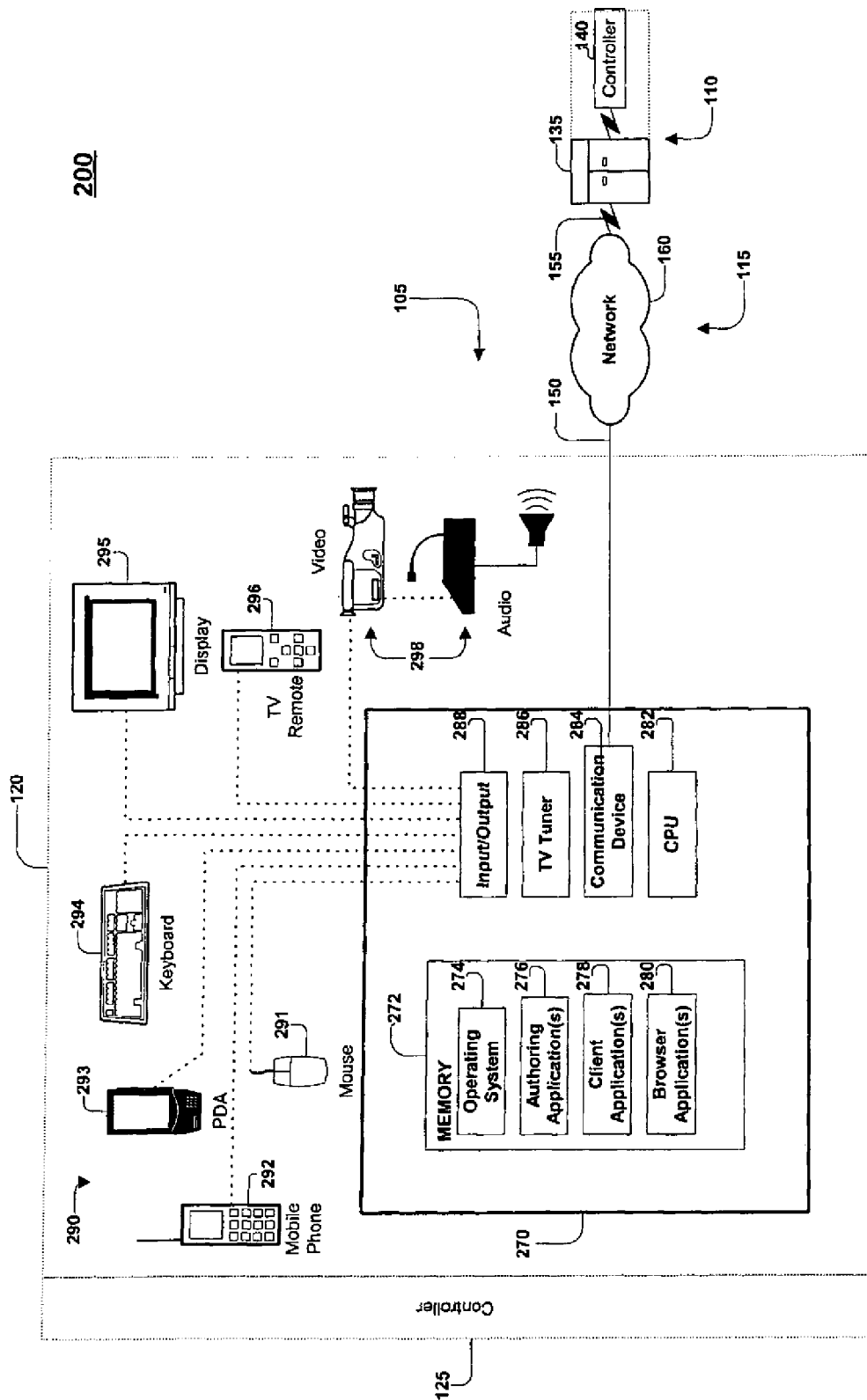

For illustrative purposes, FIGS. 1 and 2 show an example of a communications system for implementing techniques for transferring electronic data. Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145, which are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment, or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 that provides direct or indirect communication between the client system 105 and the host system 110, irrespective of physical separation. Examples of a delivery network 160 include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

FIG. 2 illustrates a communications system 200 including a client system 105 communicating with a host system 110 through a communications link 115.

The client system 105 includes a client device 120 that typically includes a general-purpose computer 270 having an internal or external memory 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., America Online (AOL) client, CompuServe client, AOL Instant Messenger (AIM) client, interactive television (ITV) client, Internet Service Provider (ISP) client, or instant messaging (IM) client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage 272 of the general-purpose computer 270. Alternatively, in another implementation, the client controller 125 may access application programs externally stored in and/or performed by one or more device(s) external to the general-purpose computer 270.

The general-purpose computer 270 also includes a central processing unit 282 (CPU) for executing instructions in response to commands from the client controller 125, and a communication device 284 for sending and receiving data. One example of the communication device 284 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 270 optionally includes a television ("TV") tuner 286 for receiving television programming in the form of broadcast, satellite, and/or cable TV signals. The TV tuner 286 permits the client device 120 to selectively and/or simultaneously display network content received by communications device 284 and TV programming content received by the TV tuner 286.

The general-purpose computer 270 may include an input/output interface 288 that enables wired or wireless connection to various peripheral devices 290. Examples of peripheral devices 290 include, but are not limited to, a mouse 291, a mobile phone 292, a personal digital assistant (PDA) 293, an MP3 player (not shown), a keyboard 294, a display monitor 295 with or without a touch screen input, a TV remote control 296 for receiving information from and rendering information to users, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 120. For example, the mobile phone 292 or the PDA 293 may include computing and networking capabilities and function as a client device 120 by accessing the delivery network 160 and communicating with the host system 110. Furthermore, the client system 105 may include one, some or all of the components and devices described above.

Figure 3:
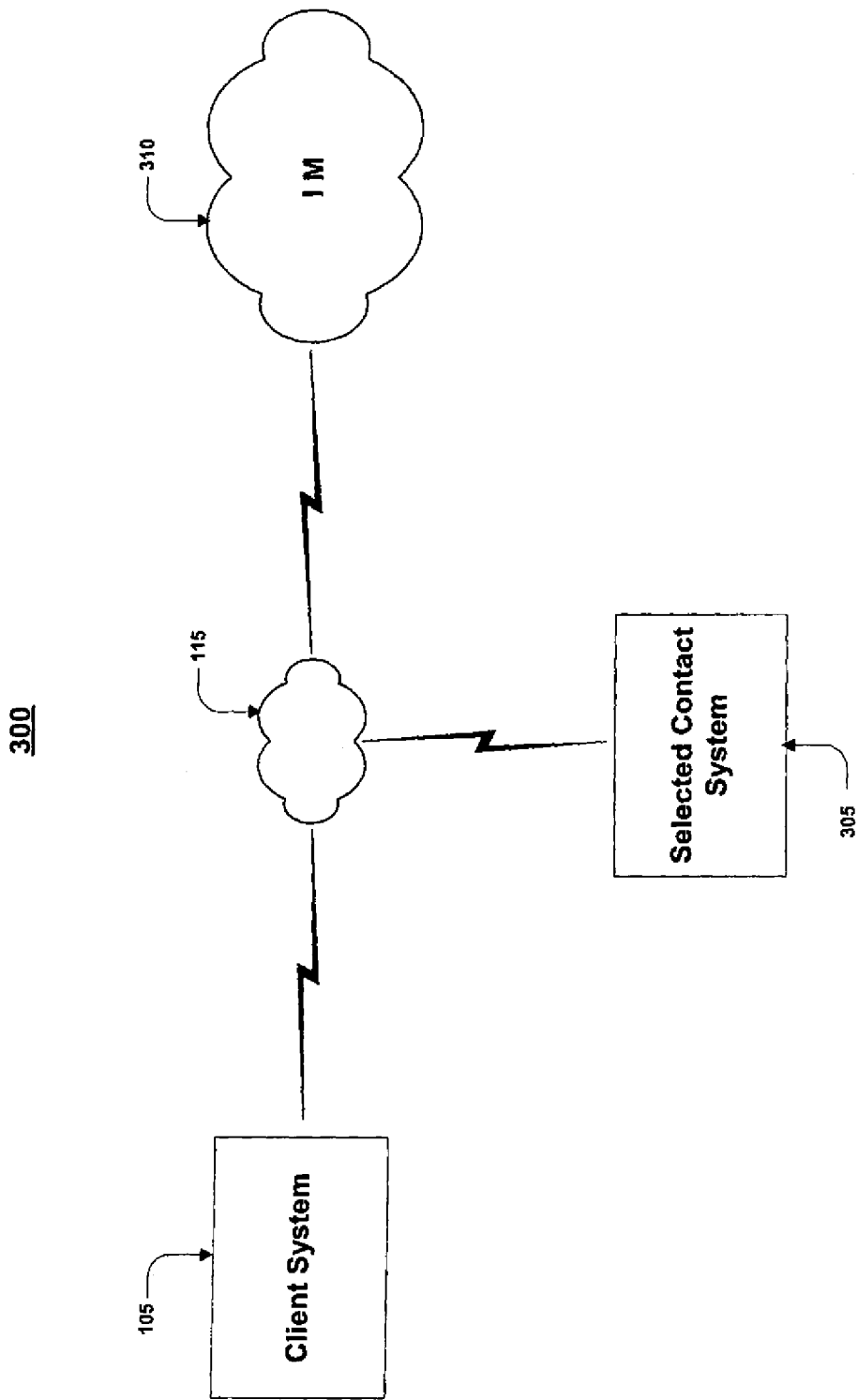

FIG. 3 illustrates a communications system 300 including a client system 105 communicating with a selected contact system 305 and an IM host system 310 through a communication link 115. The communications system 300 enables a user to communicate with a selected contact such as, for example, a selected contact listed in the user's address book. Such a communications system may be used by users of IM service providers, such as, for example, AIM, ICQ, Yahoo Messenger, and Microsoft Messenger. Typically, IM communications involve an instantaneous or nearly instantaneous communication between two users, where each user is able to transmit, receive and display communicated information. Additionally, IM communications generally involve the display and perception of online presence state information regarding other selected users ("buddies"). IM communications may be machine-to-machine communications that occur without intervention by or communication through an instant messaging server after a communication session is established or authentication is performed.

In one implementation, the IM host system 310 may have characteristics similar to those described above with respect to the host system 110, the selected contact system 305 may have characteristics similar to those described above with respect to the client system 105, and the client system 105 and the selected contact system 305 may include communication software to enable users of the client systems to access the IM host system 310.

The IM host system 310 may support IM services irrespective of an IM user's network or Internet access. Thus, the IM host system 310 may allow users to send and receive IMs, regardless of whether they have access to any particular ISP. The IM host system 310 also may support associated services, such as administrative matters, advertising, directory services, chat, and interest groups related to the IM. The IM host system 310 has an architecture that enables the devices (e.g., servers) within the IM host system 310 to communicate with each other. To transfer data, the IM host system 310 employs one or more standard or exclusive IM protocols.

To access the IM host system 310 to begin an IM session in the implementation of FIG. 3, the client system 105 establishes a connection to the IM host system 310. Once a connection to the IM host system 310 has been established, the client system 105 may directly or indirectly transmit data to and access content from the IM host system 310. By accessing the IM host system, an IM user can use the IM client application to view whether particular users ("buddies") are online, exchange IMs with particular buddies, participate in group chat rooms, trade files such as pictures, invitations or documents, find other buddies with similar interests, get customized information such as news and stock quotes, and search the Web. The selected contact system 305 may be similarly manipulated to establish a contemporaneous connection with IM host system 310.

Once connectivity is established, an IM user who is using client system 105 may view whether a selected contact using selected contact system 305 is online, and typically may view whether the selected contact is able to receive IMs. If the selected contact is online, the IM user may exchange IMs with the selected contact.

In one implementation, the IMs sent between client system 105 and selected contact system 305 are routed through IM host system 310. In another implementation, the IMs sent between client system 105 and selected contact system 305 are routed through a third party server (not shown), and, in some cases, are also routed through IM host system 310. In yet another implementation, the IMs are sent directly between client system 105 and selected contact system 305.

Figure 4A:
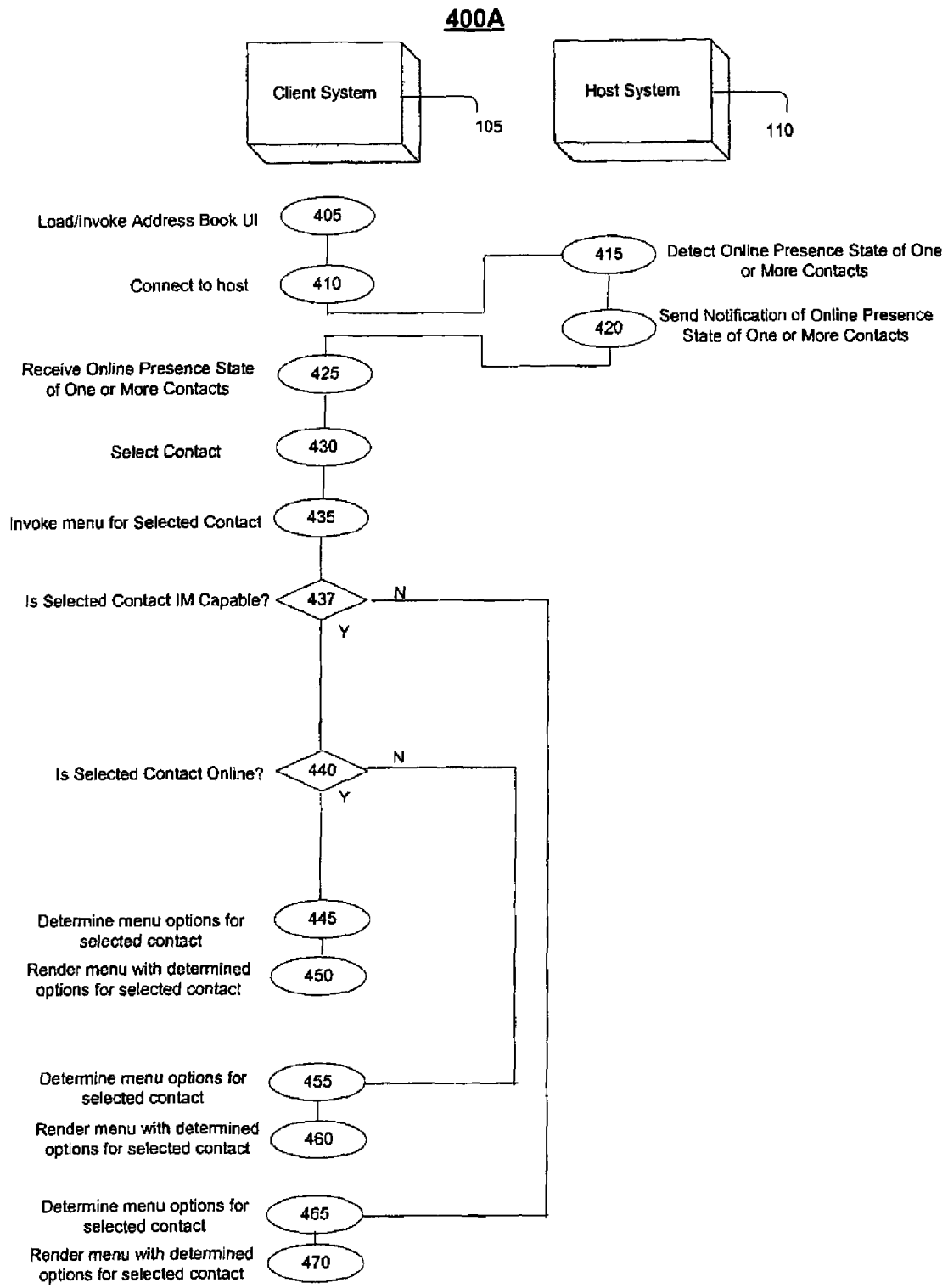
FIGS. 4A, 4B, & 4C are flow charts of exemplary processes that may be implemented by systems such as those of FIGS. 1-3.
Figure 4B:
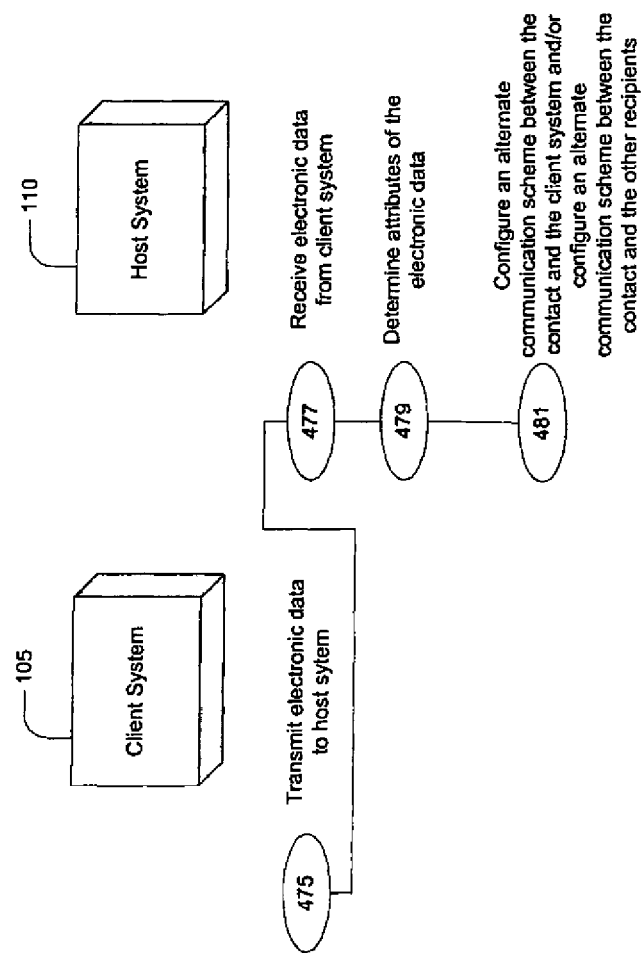
Figure 4C:
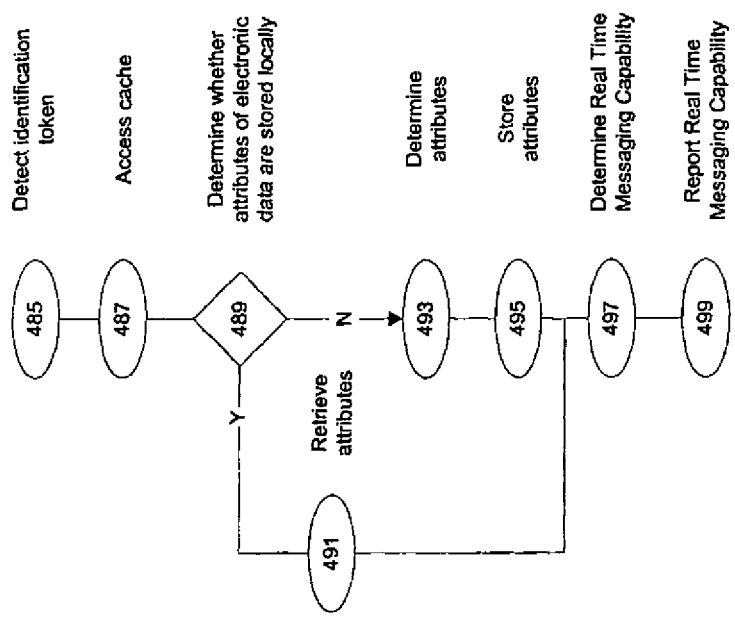

Referring to FIGS. 4A, 4B, and 4C, the client system 105 and the host system 110 interact according to exemplary procedures 400A, 400B, and 400C to intelligently enable menu choices for a user of an address book based upon the online presence state of a contact.

Procedures 400A, 400B, and 400C may be implemented by any type of hardware, software, device, computer, computer system, equipment, component, program, application, code, storage medium, or propagated signal. Although not shown in FIGS. 4A, 4B, and 4C, the client system 105 and the host system 110 may be directly or indirectly interconnected through known or described delivery networks, examples of which are described with respect to network 160.

The procedures 400A, 400B, and 400C may be implemented in a client/host context, or a standalone or offline client context. For example, while some functions of procedures 400A, 400B, and 400C may be performed entirely by the client system 105, other functions may be performed by host system 110 or by the collective operation of the client system 105 and the host system 110. The host system 110 is a computer remote to the instant messaging operator systems, and may be, for example, an IM host system 310. In procedures 400A, 400B, and 400C, the intelligently enabled menu may be respectively selected and rendered by the standalone/offline device, and the menu may be accessed or updated through a remote device in a non-client/host environment such as, for example, a LAN server serving an end user or a mainframe serving a terminal device. Thus, the procedures 400A, 400B, and 400C described below may be implemented for any OSP, ISP, browser and/or other software program having a graphical user interface, such as programs for instant messaging, chat, electronic mail and stand-alone browsers.

Figure 5:
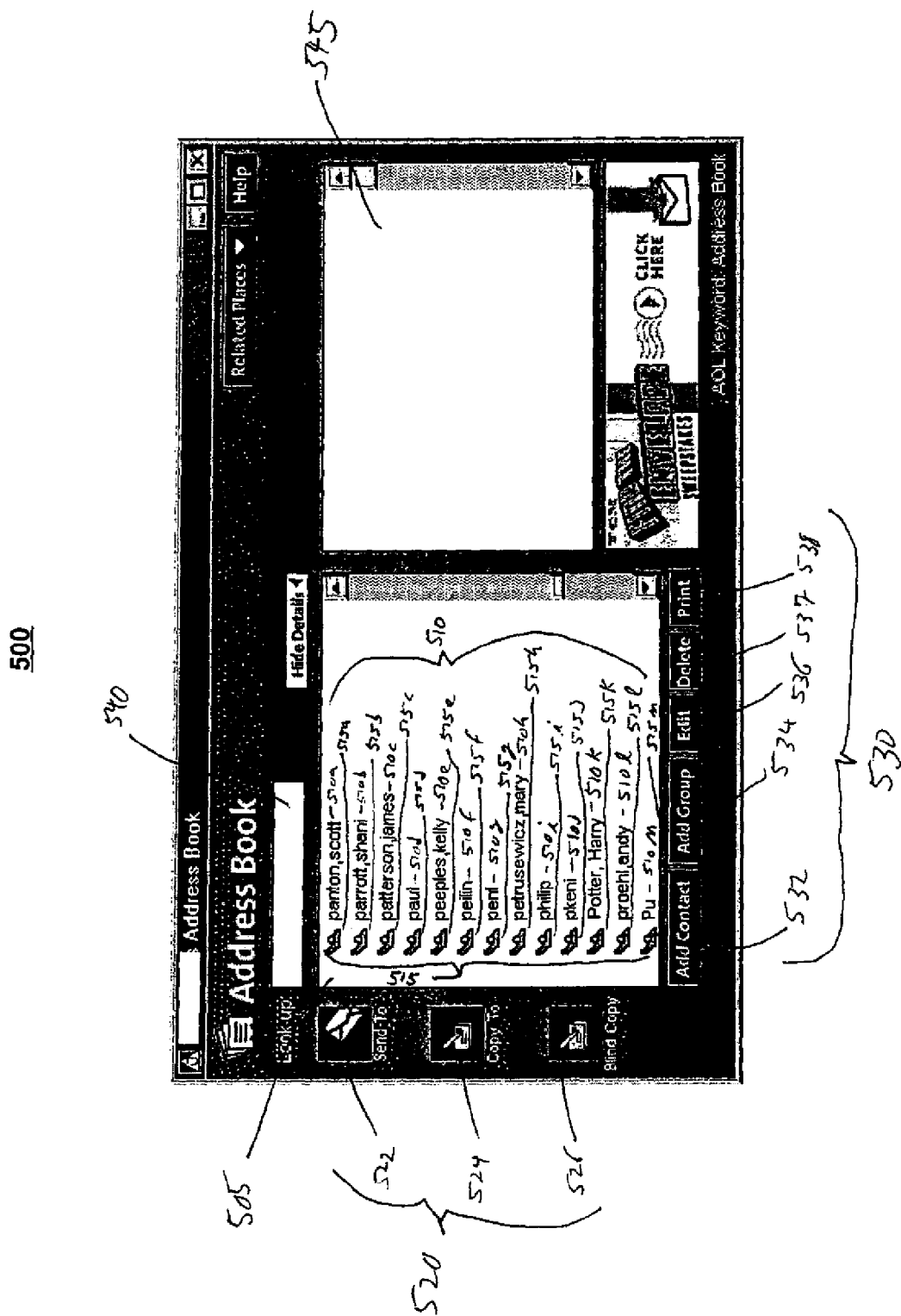
FIGS. 5-12 are illustrations of different graphical user interfaces that may be implemented by systems such as those of FIGS. 1-3 when executing a process such as those of FIGS. 4A, 4B, & 4C.

Referring to FIG. 4A and procedure 400A, the user loads or invokes an address book user interface (UI) (step 405). FIG. 5 describes an exemplary address book UI available to the user. The address book contains one or more contacts, along with information regarding the contact, such as name, address, telephone, e-mail address, and instant messaging screen name. Loading or invoking the address book may include populating the address book with contacts and information regarding the contacts, and also may include updating information about contacts in the address book.

The client system 105 logs in or otherwise accesses the host system 110 (step 410). For instance, client system 105 may connect to the host system 110 across a network (e.g., network 160) by supplying verifiable credentials to a server (e.g., a login server) at the host system 110. More specifically, a browser may be used to access a web-available interface, an IM client may be used to access a selectable interface, or an IM client that has an interface to a host may be used, among other options.

Next, the presence state of one or more contacts in the user's address book is detected by the host system 110 (step 415). In order for the host system to obtain the list of one or more contacts for whom online presence information is desired, the host may, for example, directly consult the user's address book if the address book is maintained at the host system 110. Alternatively, the host system 110 may store a list of one or more contacts at the host system 110 or other data store remote to the host, or the client system 105 may pass a list of one or more contacts to the host system 110. The list of one or more contacts may include all of the contacts in the user's address book, less than all of the contacts in the user's address book, a selected contact or group of contacts specifically designated by the user, or contacts visible in the address book UI displayed to the user.

After detecting the presence state of the one or more contacts, the host system 110 may send or otherwise make accessible to the client system 105 the presence state information for each of the one or more contacts (step 420). Sending the presence state information may include sending a code or information corresponding to the online presence state of the contact. For example, the host system 110 may send a code corresponding to a presence state of online, using a mobile device, idle, away, offline, or not IM capable (e.g., does not have an IM screen name or does not participate in an instant messaging service). Other presences states may be included as appropriate.

Figure 6:
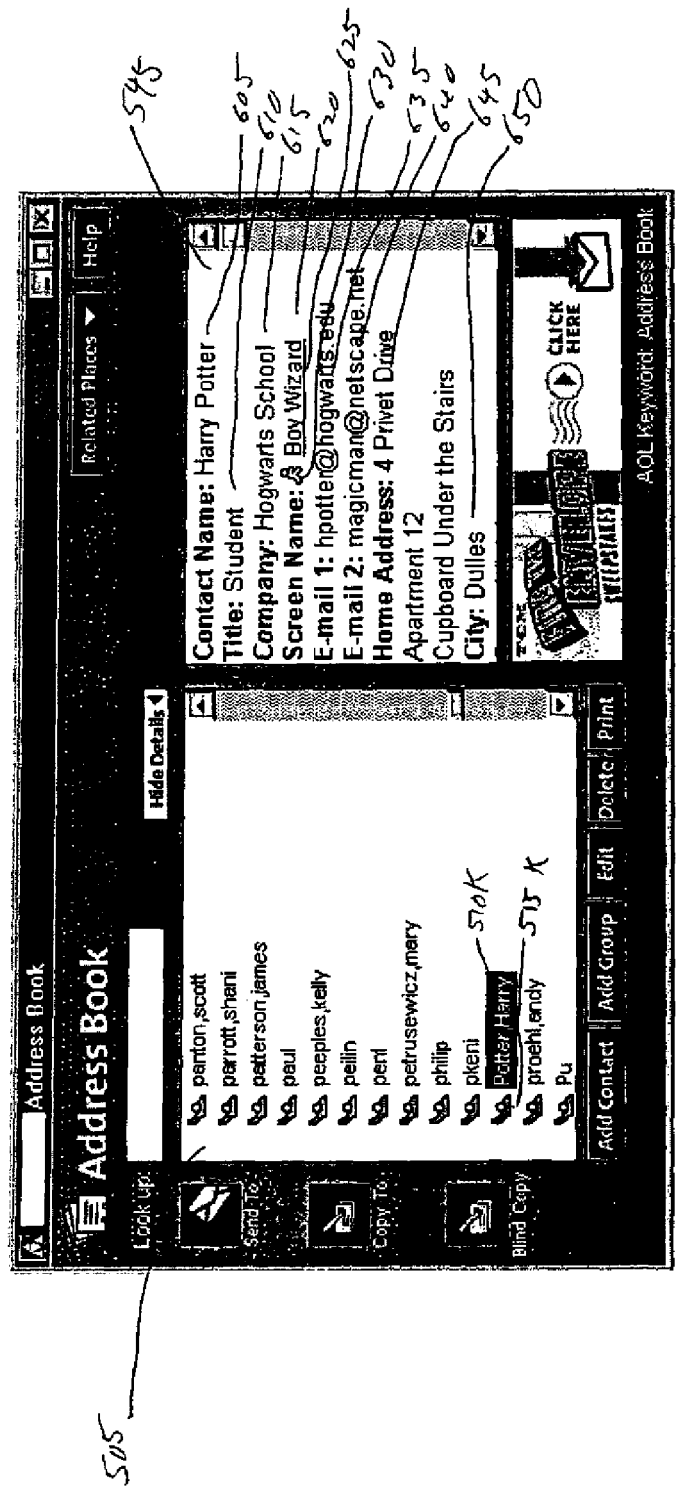

The online presence state of the one or more contacts is then received or accessed by the client system 105 (step 425). The user is enable to perceive the online presence state of the one or more contacts, and the online presence state may be displayed to the user. FIG. 6 illustrates an exemplary interface available to the user, which will be described below, and which may be used to display online presence information for an address book contact.

Next, a contact is selected by the user (step 430). FIG. 6, described below, illustrates an exemplary interface available to the user that may be used to select a contact. More than one contact may be selected.

Figure 12:
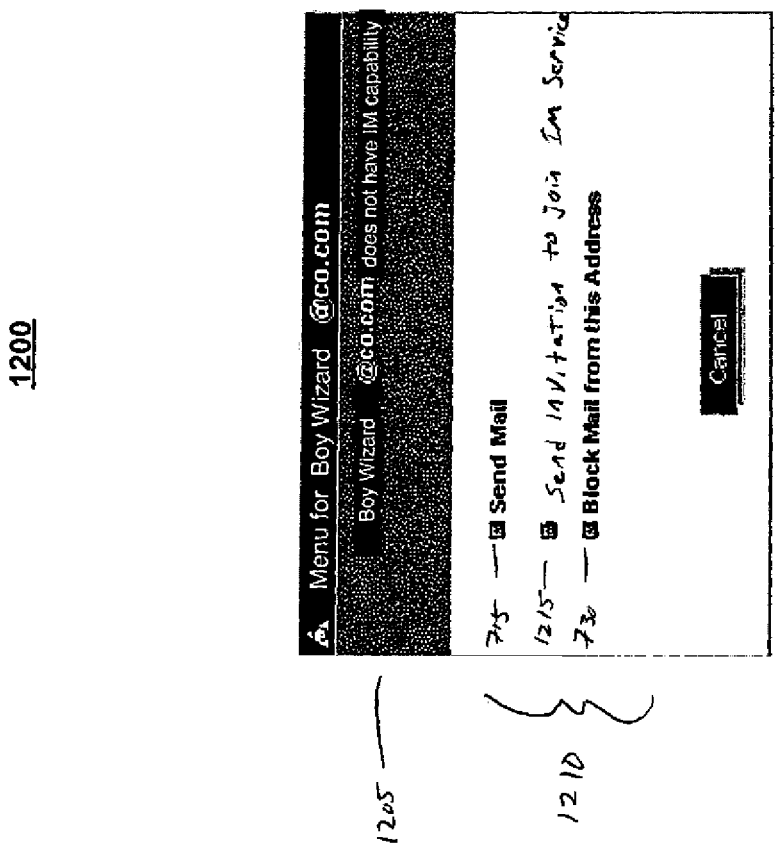

A menu then is invoked for the selected contact (step 435). The menu may be invoked through user manipulation of a UI, such as the address book UI. After invoking the menu, a determination is made as to whether the selected contact is IM capable (step 437). If the selected participant is not IM capable, then a set of menu options are determined for the selected non-IM capable contact (step 465) and the menu is rendered with the determined options (step 470). Determining the menu options may include configuring options for alternative communications channels based upon the online presence state. For example, when the selected contact is not IM capable, the communications channels may include e-mail but not IM. FIG. 12 illustrates an exemplary interface available to a user when the selected contact is not IM capable.

Next, a determination is made as to whether the selected contact is online (step 440). Depending upon the online presence state, different actions may be taken. Although described in terms of online versus offline menus in this example, other implementations are possible. For example, different actions could be taken based upon other online states, such as whether the contact is using a mobile device, has been inactive for a certain period of time, has set an indication of being away or unavailable, or has enabled or disabled the user's ability to detect the contact's presence.

If the selected contact is online, the online menu options are determined for the selected contact (step 445) and the menu is rendered with the online options (step 450). The online menu options are options which are desired to be presented to the user when the desired contact is online or otherwise available. Determining the online menu options may include configuring options for alternative communications channels based upon the online presence state. For example, when the selected contact is online, the communications channels may include e-mail and IM.

Figure 7:
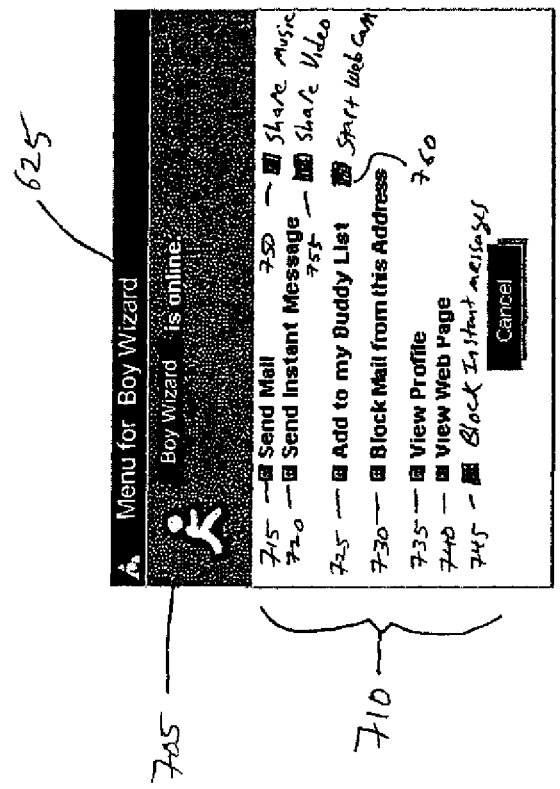
Figure 8:
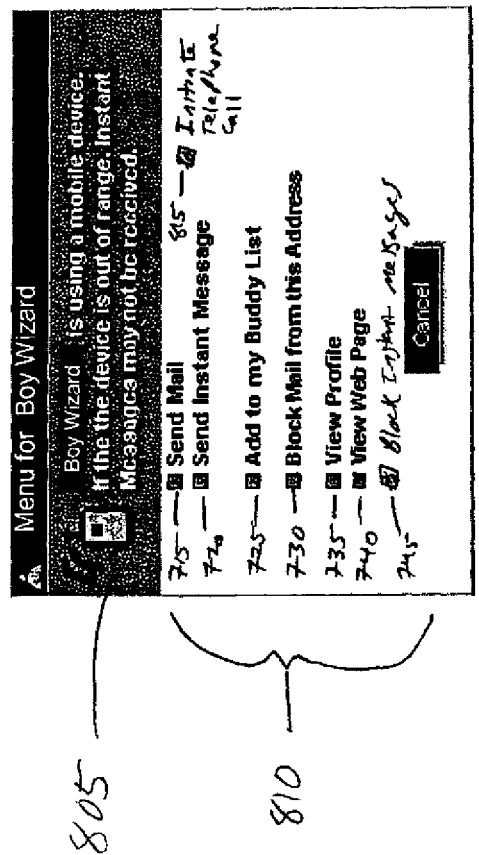
Figure 9:
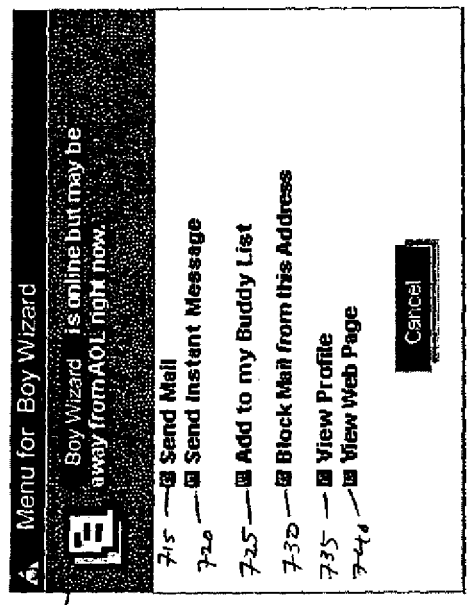
Figure 10:
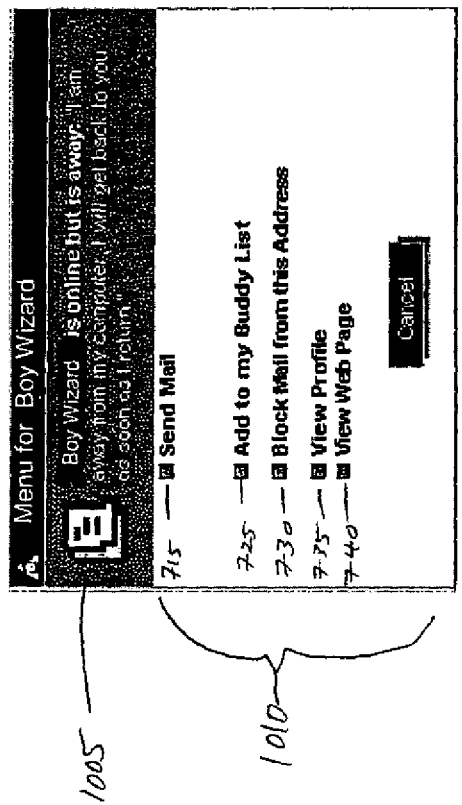

The online menu options may be pre-stored at the host system 110, the client system 105, or other remote data store. Alternatively, the online menu options may be generated on-the-fly by the host system 110 or the client system 105 based upon a set of rules. FIG. 7 describes an exemplary interface available to a user when the selected contact is online. FIGS. 8-10 describe exemplary interfaces available to a user when the selected contact is online, where additional online presence information is available. In particular, FIG. 8 describes an exemplary interface that may be presented when the selected contact is using a mobile device, FIG. 9 describes an exemplary interface that may be presented when the selected contact is idle, and FIG. 10 describes an exemplary interface that may be presented when the selected contact is unavailable. Other interfaces may be presented based upon other online presence information.

If the selected contact is offline, the offline menu options are determined for the selected contact (step 455) and the menu is rendered with the offline options (step 460). The offline menu options are options which are desired to be presented to the user when the desired contact is offline or otherwise unavailable. Determining the offline menu options may include configuring options for alternative communications channels based upon the online presence state. For example, when the selected contact is offline, the communications channels may include e-mail but not IM.

Figure 11:
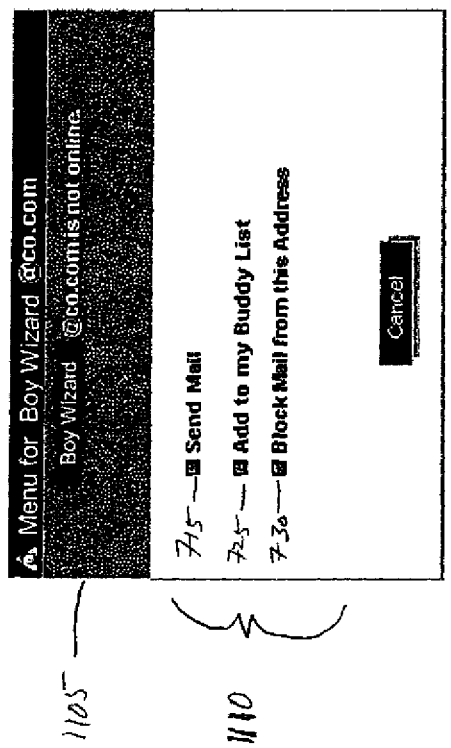

The offline menu options may be pre-stored at the host system 110, the client system 105, or other remote data store. Alternatively, the offline menu options may be generated on-the-fly by the host system 110 or the client system 105 based upon a set of rules. FIG. 11 describes an exemplary interface available to a user when the selected contact is offline. Also, if it is not possible to determine the online presence status of the selected contact, the user may be prompted to take appropriate action. For example, if the contact lacks an instant messaging screen name, the user may be prompted to enter a screen name.

The order of steps 405-470 may vary. For example, the client system may connect to the host (step 410) before the address book UI is loaded or invoked (step 405), and the contact may be selected (step 430) before the online presence information is received (step 425). Certain steps may be combined or omitted entirely, as appropriate. Referring to FIG. 4B, a client system 105 and a host system 110 interact according to a procedure 400B to transmit electronic data. Initially, a sender (e.g., a contact) transmits electronic data to the host system 110 (step 475). In one implementation, the sender is a client system 105 associated with a contact who is an end user of the communication system 100. In another implementation, the sender aids the client system in transmitting electronic data through a communications link 115 to the host system 110. In yet another implementation, the sender is a server, such as a processing server, within the host system 110. For example, the processing server may be a web mail server arranged to store and forward electronic data transmitted between end users of the communication system 100.

The host system 110 receives the electronic data from the sender (step 477). In one implementation, the mail gateway receives the electronic data from the client system 105 and/or the processing server. Typically, the mail gateway will receive electronic content from subscribers through a dial up telephone network or DSL (digital subscriber line) and will receive electronic content from non-subscribers indirectly through the Internet. The mail gateway may perform protocol conversions if necessary to receive electronic content from non-subscribers.

After receiving the electronic data from the client system 105 (step 477), the host system 110 determines one or more attributes of the electronic data (step 479). Attributes of the electronic data may include, but are not limited to, an identification token, the author of the electronic data, the recipient(s) of the electronic data, the subject of the electronic data, the date and time of the transmission, and/or whether the electronic data contains attachments or embedded images. The host system 110 typically will store the contents and attributes of the electronic data. For example, in one implementation, contents of the electronic data are stored in a storage area on the host system 110 and the attributes of the electronic data are cached locally in a server on the host system 110 and also stored in a database on the host system 110, such as, for example, a tandem database. The body of the electronic data is stored in databases on the host system 110 such as, for example, electronic content databases. Attachments are stored in a different database on the host system 110, such as, for example, an attachment database. In this example, the body of the electronic data is stored twice to assure its availability. Due to the typically large sizes of attachments, however, such objects are only stored once to conserve memory space.

The tandem database 110 includes a system of folders corresponding to the subscribers of the host system 110. Each folder may have properties assigned by the subscriber including, for example, properties for filtering electronic content from certain sources. When electronic data are received, the folder stores the attributes of the electronic data including the location(s) of the electronic data content (i.e., body and attachments) in the storage area on the host system 110.

The host system 110 then configures an alternate communications channel between the intended recipient and the client system 105 and/or configures an alternate communications channel between the intended recipient and other recipients based on the detected attributes of the electronic data (step 481). As described with respect to FIG. 4A, menu options may be determined and a menu may be rendered based upon the attributes of the electronic data and/or the availability of alternate communication channels.

FIG. 4C illustrates one implementation of a procedure 400C for configuring menu options that enable an alternate communications channel. Initially, the host system 110 detects an identification token associated with incoming electronic data (e.g., an e-mail message) (step 485). The identification token may be intercepted by the host system 110 and/or presented to the host system 110 by the client system 105. By referencing the token, the host system 110 accesses a cache (step 487) and determines whether attributes of the electronic data are stored locally (step 489). Such attributes may include, but are not limited to, a listing of the sender and all recipients associated with the electronic data.

If attributes of the electronic data are stored locally, the host system 110 retrieves the attributes from the local cache (step 491). If, on the other hand, attributes of the electronic data are not stored locally, the host system 110 determines the attributes of the electronic data (step 493) and then stores the attributes in a local cache (step 495). The host system 110 may determine the attributes of the electronic data itself and/or may access another server to determine the attributes. In one implementation, the attributes of the electronic data include a listing of the sender and the recipients associated with the electronic data.

In one implementation, the host system 110 listing includes e-mail addresses of subscribers and non-subscribers of the communications system 100. The host system 110 strips the domain (e.g., @aol.com) from the e-mail address of a subscriber (contact) with a recognized domain to obtain the subscriber's IM screen name (step 497). This step facilitates the reverse look-up process.

The host system 110 determines the instant messaging capability of each of the e-mail addresses and/or screen names (step 499). For example, the host system may check to see whether a screen name is associated with an active account having IM capability and, if so, obtain the online presence state of the screen name.

In one implementation, the host system 110 provides a menu option to send an invitation to those contacts without instant messaging capability to become IM capable. For those contacts with instant messaging capability, the host system 110 identifies the online presence state of the particular contact (e.g., online, offline, away, busy, or not IM capable). The online presence of a particular contact can be detected, for example, from a persistent connection to an IM server and/or the activity of a specific control port. As discussed, a particular graphical user interface is displayed to the user based on the IM presence state of the contact. For example, upon opening an e-mail message from a contact, the user may receive one or more redirection commands based on the IM state of the contact and/or any other addressees of the e-mail message. The redirection command may include a URL for navigating the user's browser to a particular URL associated with a graphical user interface and/or icon corresponding to one of the IM states.

In an HTML-based environment, the redirection command may include source code such as, for example:

```
<AHREF="emailaction.tmpl?from=user@domain.com&email=
user@domain.com&name=&givenname=&sn="><IMGSRC=
"http://imserver.imhostcomplex.osp.com:80/user@domain.com?on_url=
http://tristate.team.com/webmail/br/nc/images/online.gif&off_url=http://
tristate.team.com/webmail/br/nc/images/offline.gif&noexist_url=
http://tristate.team.com/webmail/br/nc/images/noexists.gif" WIDTH=
16 HEIGHT=16 BORDER=0></A>
    <AHREF="emailaction.tmpl?from=user@domain.com&email=
user@domain.com&name= &givenname=&sn="">user@domain.com</A>
```

When the source code is rendered by a browser application, a state image may be shown even if the contact is off-line or not IM capable. Each state typically is associated with a different image. In this example, a fixed height and width attribute is placed in the [Unable to display image] tag, which allows the web page to render before the images have been resolved.

FIG. 5 illustrates an example of an address book UI 500 that may be presented to a user. The UI 500 includes a contact list 505 populated with one or more contacts 510. The contacts 510 may be one of several types, including an individual contact and a group contact. A group contact typically is a collection of one or more individual contacts. Each contact may include a name of the contact and one or more icons 515 associated with the contact. The icons 515 may indicate, for example, the online presence state of the contact. The icons 515 may also indicate a property of the contact, such as, for example, whether the contact is an individual or a group contact. As shown, contacts 510a, 510b, 510c, 510d, 510e, 510f, 510g, 510h, 510i, 510j, 510k, 510l, and 510m are displayed and associated with icons 515a, 515b, 515c, 515d, 5151e, 515f, 515g, 515h, 515i, 515j, 515k, 515l, and 515m. In general, the UI 500 is rendered on the client system 105 using software stored on the client system 105.

The UI 500 also includes controls 520 and controls 530 for taking an action with respect to a contact or contacts 510. As shown, controls 520 include a control 522 to send an e-mail message to a selected contact, a control 524 to copy an e-mail message to a contact, and a control 526 to send a blind copy of an e-mail to a contact. Controls 530 include a control 532 to add a contact to the address book, a control 534 to add a group contact (group) to the address book, a control 536 to edit information about a contact in the address book, a control 537 to delete a contact, and a control 538 to print information about a contact. Other controls, such as a control to send an instant message to a contact, may be provided in UI 500. The controls, including controls 520 and 530, may be intelligently enabled depending upon the online status of the contact in the address book.

In addition, the UI 500 may include a search window 540 and a contact details window 545. The search window 540 enables a user to locate a contact by searching for one or more contact attributes in the address book. In one implementation, the user may search for contacts who have a specified online presence state. For example, the user may search for contacts who are online. The contact details window 545 is used to display detailed information about a selected contact.

FIG. 6 illustrates an example of an address book UI 600 that may be presented to a user who has selected a contact. As shown, the contact 510k has been selected from among the contacts in the contact list 505. The user may manually select the contact 510k using an input device, or the contact 510k may be automatically selected by a computer program, such as a computer program running on the client system 105.

Contact details window 545 provides additional information related to the selected contact 510k. The information includes one or more of the following: the contact name 605; a title 610; a company 615; a screen name 620, which may further include a link 625 to a communication program for communicating with the screen name and an online presence status 630; e-mail addresses 635 and 640; and a home address 645, including a city 650, state (not shown), ZIP code (not shown), and a country (not shown). The information may also include one or more of the following (not shown): a work address, including a city, state, ZIP code, and country; telephone numbers, including telephone numbers for home, work, fax, cellular, and pager; a home page on the Internet; a birthday; an anniversary; a spouse's name; family member names and relationships; notes; and a category. The online presence status 630 may include an icon or a description representative of the online presence status. The online presence status 630 may be updated by information from the host system 110 or the client system 105. An icon 515k may also be displayed, and may represent the online presence status 630.

FIG. 7 illustrates one example of a UI 700 that may be presented to a user of an address book program. The UI 700 may be invoked manually through user manipulation of an input device, or may be invoked automatically, for example, upon the occurrence of some event such as the receipt of a communication from a contact. The UI displays an online presence state 705 for the screen name 625, and the menu choices 710 are enabled based upon the online presence state 705. As shown in FIG. 7, the contact has a presence state 705 of online.

The UI 700 contains intelligently enabled menu choices for actions that may be taken with respect to a contact 510 in the address book based upon the online presence state of the contact 510. The menu choices 710 may be pre-stored, or may be configured on-the-fly based upon the online presence state 705. Also, during transition from one online presence state to a different state, a smoothing technique may be implemented to avoid excessive re-configuration of menu options. Intelligently enabling the menu choices 710 includes adding, changing, deleting, enabling, or graying out or otherwise disabling the menu choices. Typically, the menu choices enabled are those that are appropriate in the context of the current online presence state. For example, if the contact is offline, a menu option to send an instant message 720 will be removed or disabled.

In the example of FIG. 7, the UI 700 includes menu choices 710 for a contact 510k having a screen name 625. The menu choices 710 include options to send e-mail 715, send an instant message 720, add the contact to a buddy list 725, block e-mail from the contact 730, view the contact's profile information 735, view a web page associated with the contact 740, block instant messages from the contact 745, share music 750, share video 755, and start a webcam 760.

FIG. 8 illustrates another example of a UI 800 that is similar to UI 700 and may be presented to a user of an address book program. The UI 800 contains intelligently enabled menu choices for actions that may be taken with respect to a contact 510 in the address book based upon the online presence state of the contact 510.

The UI 800 displays an online presence state 805 for the screen name 625, and the menu choices 810 are enabled based upon the online presence state 805, which in this case indicates that the contact is using a mobile device. Menu choices are enabled as appropriate in the context of the current online presence state. For example, since the contact is using a mobile device, a menu option to initiate a phone call 815 may be added. As shown, the UI 800 includes menu choices 810 to send e-mail 715, send an instant message 720, add the contact to a buddy list 725, block e-mail from the contact 730, view the contact's profile information 735, view a web page associated with the contact 740, and initiate a telephone call with the contact 815 at the contact's mobile device phone number. The option to block instant messages 745, discussed with respect to FIG. 7, has been removed from the menu choices 810.

FIG. 9 illustrates another example of a UI 900 that is similar to UIs 700 and 800 and may be presented to a user of an address book program. The UI 900 contains intelligently enabled menu choices for actions that may be taken with respect to a contact 510 in the address book based upon the online presence state of the contact 510.

The UI 900 displays an online presence state 905 for the screen name 625, and the menu choices 910 are enabled based upon the online presence state 905, which in this case indicates that the contact is idle. Menu choices are enabled as appropriate in the context of the current online presence state. For example, since the contact is idle, a menu option to block instant messages from the contact 745 may be removed. As shown, the UI 900 includes menu choices 910 to send e-mail 715, send an instant message 720, add the contact to a buddy list 725, block e-mail from the contact 730, view the contact's profile information 735, and view a web page associated with the contact 740. Since the contact is not using a mobile device, the menu choice to initiate a telephone call with the contact 815, discussed with respect to FIG. 8, is not presented here. However, in other implementations, the option to initiate a telephone call could be presented whenever a telephone number (land line and/or mobile) is available for the contact.

FIG. 10 illustrates another example of a UI 1000 that is similar to UIs 700, 800, and 900 and may be presented to a user of an address book program. The UI 1000 contains intelligently enabled menu choices for actions that may be taken with respect to a contact 510 in the address book based upon the online presence state of the contact 510.

The UI 1000 displays an online presence state 1005 for the screen name 625, and the menu choices 1010 are enabled based upon the online presence state 1005, which in this case indicates that the contact is away. Menu choices are enabled as appropriate in the context of the current online presence state. For example, since the contact is away, menu options to send an instant message 720 and to block instant messages from the contact 745 may be removed. As shown, the UI 1000 includes menu choices 1010 to send e-mail 715, add the contact to a buddy list 725, block e-mail from the contact 730, view the contact's profile information 735, and view a web page associated with the contact 740.

FIG. 11 illustrates another example of a UI 1100 that is similar to UIs 700, 800, 900 and 1000 and may be presented to a user of an address book program. The UI 1100 contains intelligently enabled menu choices for actions that may be taken with respect to a contact 510 in the address book based upon the online presence state of the contact 510.

The UI 1100 displays an online presence state 1105 for the screen name 625, and the menu choices 1110 are enabled based upon the online presence state 1105, which in this case indicates that the contact is offline. Menu choices are enabled as appropriate in the context of the current online presence state. For example, since the contact is offline, menu options to send an instant message 720 and to block instant messages from the contact 745 may be removed. Also, menu choices to view the contact's profile information 735 and view a web page associated with the contact 740 have been removed. As shown, the UI 1100 includes menu choices 1110 to send e-mail 715, add the contact to a buddy list 725, and block e-mail from the contact 730.

FIG. 12 illustrates another example of a UI 1200 that is similar to UIs 700, 800, 900, 1000, and 1100 and may be presented to a user of an address book program. The UI 1200 contains intelligently enabled menu choices for actions that may be taken with respect to a contact 510 in the address book based upon a determination that the contact 510 does not have the capability to communicate by IM or does not have an associated IM screen name.

The UI 1200 displays an online presence state 1205 for the screen name 625, and the menu choices 1210 are enabled based upon the online presence state 1205, which in this case indicates that the contact is not IM capable. Menu choices are enabled as appropriate in the context of the current online presence state. For example, since the contact is not IM capable, menu options to send an instant message 720, add the contact to a buddy list 725, and to block instant messages from the contact 745 may be removed. Also, menu choices to view the contact's profile information 735 and view a web page associated with the contact 740 have been removed. As shown, the UI 1200 includes menu choices 1210 to send e-mail 715, block e-mail from the contact 730, and invite the contact to join an IM service 1215 so as to become IM capable.

Other implementations are within the scope of the following claims. For example, other online presence states may be defined and used to intelligently enable menu choices. In addition, menu choices in an address book may be intelligently enabled based upon other factors. For example, if a contact has already been added to an instant messaging buddy list of the user, the option to add the contact to the buddy list may be disabled. In another example, if the contact does not have a phone number stored, an option to call the contact may not be presented. In yet another example, the menu choices may be intelligently enabled based upon the e-mail address of the sender. For instance, additional menu choices may be enabled for a contact having a given hostname and/or domain name in their e-mail address, such as "aol.com," which may be associated with an "aol.com" screen name. Also, the user interface may be a viewable interface, an audible interface, a tactile interface, or any combination of these.

What is claimed is:

1. A method comprising:
    detecting, within a first user interface area of a first communication system, a selection of a contact within the first communication system by a user of the first communication system;

determining, by at least one processor, whether the contact is on a list of contacts of the user with a second communication system stored on a server by:
identifying a screen name from an e-mail address corresponding to the contact in the first communication system; and
utilizing the screen name from the e-mail address corresponding to the contact in the first communication system to identify a screen name corresponding to the contact in the second communication system;
enabling one or more menu options based upon whether the contact is on the list of contacts of the user with the second communication system, wherein the enabled one or more menu options when the contact is on the list of contacts of the user with the second communication system are different from the enabled one or more menu options when the contact is not on the list of contacts of the user with the second communication system; and
presenting to the user, within a second user interface area, the enabled one or more menu options that are based upon whether the contact is on the list of contacts of the user with the second communication system.

2. The method of claim 1, further comprising including an option to add the contact to the list of contacts of the user with the second communication system as one of the enabled one or more menu options when the contact is not on the list of contacts of the user with the second communication system.

3. The method of claim 1, wherein one of the enabled one or more menu options when the contact is on the list of contacts of the user with the second communication system is the same as one of the enabled one or more menu options when the contact is not on the list of contacts of the user with the second communication system.

4. The method of claim 1, wherein the first communication system comprises at least one of an e-mail communication system or an instant messaging communication system.

5. The method of claim 1, wherein the second communication system comprises at least one of an e-mail communication system or an instant messaging system.

6. The method of claim 1, wherein the enabled one or more menu options are further based on whether the contact is determined to be in an online state or an offline state with regard to the second communication system.

7. The method of claim 1, wherein identifying the screen name from the email address corresponding to the contact in the first communication system comprises striping a domain from the e-mail address and comparing a remaining portion of the e-mail address to a database of screen names.

8. The method of claim 7, wherein identifying the screen name from the e-mail address corresponding to the contact in the first communication system comprises checking to see whether the screen name is associated with an active account having IM capability.

9. The method of claim 1, wherein one of the enabled one or more menu options when the contact is on the list of contacts of the user with the second communication system comprises an option to message the contact using the second communication system.

10. The method of claim 1, wherein presenting the enabled one or more menu options comprises presenting an indication of whether the contact is in an online state or an offline state.

11. The method of claim 1, wherein one of the enabled one or more menu options within the second user interface area comprises an option to view a user profile of the contact.

12. A non-transitory computer-readable storage medium storing instructions, which when executed on at least one processor, causes the at least one processor to perform a method, the method comprising:
detecting, within a first user interface area of a first communication system, a selection of a contact within the first communication system by a user of the first communication system;
determining whether the contact is on a list of contacts of the user with a second communication system stored on a server by:
identifying a screen name from an e-mail address corresponding to the contact in the first communication system; and
utilizing the screen name from the e-mail address corresponding to the contact in the first communication system to identify a screen name corresponding to the contact in the second communication system;
enabling one or more menu options based upon whether the contact is on the list of contacts of the user with the second communication system, wherein the enabled one or more menu options when the contact is on the list of contacts of the user with the second communication system are different from the enabled one or more menu options when the contact is not on the list of contacts of the user with the second communication system; and
presenting to the user, within a second user interface area, the enabled one or more menu options that are based upon whether the contact is on the list of contacts of the user with the second communication system.

13. The non-transitory computer-readable storage medium of claim 12, wherein one of the enabled one or more menu options when the contact is on the list of contacts of the user with the second communication system is the same as one of the enabled one or more menu options when the contact is not on the list of contacts the user with the second communication system.

14. The non-transitory computer-readable storage medium of claim 12, wherein the first communication system comprises at least one of an e-mail communication system or an instant messaging communication system.

15. The non-transitory computer-readable storage medium of claim 12, wherein the second communication system comprises at least one of an e-mail communication system or an instant messaging system.

16. The non-transitory computer-readable storage medium of claim 12, wherein:
identifying the screen name from the email address corresponding to the contact in the first communication system comprises striping a domain from the e-mail address and comparing a remaining portion of the e-mail address to a database of screen names.

17. An apparatus comprising:
a non-transitory memory device storing instructions;
at least one processor coupled to the memory that executes the instructions to:
detect, within a first user interface area of a first communication system, a selection of a contact within the first communication system by a user of the first communication system;
determine whether the contact is on a list of contacts of the user with a second communication system stored on a server by:
identifying a screen name from an e-mail address corresponding to the contact in the first communication system; and
utilizing the screen name from the e-mail address corresponding to the contact in the first communication system to identify a screen name corresponding to the contact in the first second communication system;

enable one or more menu options based upon whether the contact is on the list of contacts of the user with the second communication system, wherein the enabled one or more menu options when the contact is on the list of contacts of the user with the second communication system are different from the enabled one or more menu options when the contact is not on the list of contacts of the user with the second communication system; and present to the user, within a second user interface area on a display device, the enabled one or more menu options that are based upon whether the contact is on the list of contacts of the user with the second communication system.

18. The apparatus of claim 17, wherein the first communication system comprises at least one of an e-mail communication system or an instant messaging communication system.

19. The apparatus of claim 17, wherein:
identifying the screen name from the email address corresponding to the contact in the first communication system comprises striping a domain from the e-mail address and comparing a remaining portion of the e-mail address to a database of screen names.

20. The apparatus of claim 17, wherein the second communication system comprises at least one of an e-mail communication system or an instant messaging system.

* * * * *